United States Patent [19]

Kawasaki et al.

[11] Patent Number: 5,576,075
[45] Date of Patent: Nov. 19, 1996

[54] METHOD FOR PRODUCTION OF MAGNETIC RECORDING MEDIUM

[75] Inventors: Kaoru Kawasaki; Akira Saitoh; Akihiko Seki; Kazuyuki Shimazaki, all of Saku; Takahiro Mori; Hisato Kato, both of Hino, all of Japan

[73] Assignees: TDK Corporation; Konica Corporation, both of Tokyo, Japan

[21] Appl. No.: 551,341

[22] Filed: Nov. 1, 1995

[30] Foreign Application Priority Data

Nov. 4, 1994 [JP] Japan .................................... 6-293645

[51] Int. Cl.⁶ ...................................................... B05D 3/00
[52] U.S. Cl. ........................ 427/565; 427/122; 427/128; 427/131; 427/407.1; 427/419.2; 427/430.1; 427/600
[58] Field of Search ..................................... 427/565, 600, 427/128–132, 407.1, 419.2, 430.1, 122

[56] References Cited

U.S. PATENT DOCUMENTS 5,424,094  6/1995  Tsunoda et al. ........................ 427/128

FOREIGN PATENT DOCUMENTS

| 49-87303   | 8/1974  | Japan . |
| 54-4244    | 3/1979  | Japan . |
| 58-133635  | 8/1983  | Japan . |
| 60-54768   | 3/1985  | Japan . |
| 61-229236  | 10/1986 | Japan . |
| 61-248230  | 11/1986 | Japan . |
| 62-6440    | 1/1987  | Japan . |
| 4-108561   | 4/1992  | Japan . |
| 4-129024   | 4/1992  | Japan . |
| 5-210843   | 8/1993  | Japan . |

*Primary Examiner*—Bernard Pianalto
*Attorney, Agent, or Firm*—Oblon, Spivak, McClelland, Maier & Neustadt, P.C.

[57] ABSTRACT

This invention concerns a method for producing a magnetic recording medium by passing a magnetic coating material comprising a ferromagnetic powder and a binder resin through an ultrasonic treating device under the operating conditions of 10 to 200 kHz of frequency of oscillation and 10 to 100 μm of amplitude of ultrasonic wave thereby effecting ultrasonic treatment of the magnetic coating material and coating the treated magnetic coating material on a substrate either directly or through an undercoating layer, characterized in that the ultrasonic treating device comprises an ultrasonic treating tank adapted to effect ultrasonic wave treatment of the magnetic coating material by passing the material therethrough, an ultrasonic wave horn inserted into the ultrasonic treating tank and provided with an operating end surface capable of exerting an ultrasonic oscillation on the magnetic coating material, and an ultrasonic wave oscillator connected to a basal part side of the ultrasonic wave horn, an operating depth H defined by the distance from the operating end surface of the ultrasonic wave horn to a bottom wall surface of the ultrasonic treating tank opposed to the operating end surface is set at a magnitude in the range of 2 to 40 mm, and the magnetic coating material to be coated on the substrate is subjected to tile ultrasonic treatment.

13 Claims, 4 Drawing Sheets

METHOD FOR PRODUCTION OF MAGNETIC RECORDING MEDIUM

FIELD OF THE INVENTION

This invention relates to a method for the production of a so-called coating type magnetic recording medium, and more particularly to a method for the production of a magnetic recording medium which comprises pretreating a magnetic coating material by irradiation with an ultrasonic wave thereby vesting the magnetic coating material with an excellent ability to disperse the magnetic powder contained therein and render agglomeration of the dispersed magnetic powder difficult and then depositing the pretreated coating material on a substrate by means of coating.

DESCRIPTION OF THE PRIOR ART

When a conventional magnetic coating material prepared by the use of a magnetic powder is to be deposited on a substrate by means of coating, it has the disadvantage of being readily susceptible of agglomeration as compared with other coating materials because tile magnetic coating material has an extremely high solids concentration and possesses magnetic energy.

To solve this problem, methods which comprise treating a magnetic coating material by the irradiation with an ultrasonic wave and supplying the treated magnetic coating material to a part to be coated (JP publication Sho. 54-4,244, JP laid-open Sho. 49-87,303, JP laid-open Sho. 58-133,635, JP laid-open Sho. 61-229,236, JP laid-open Sho. 62-6,440, JP laid-open Hei. 04-129,024, and JP laid-open Hei. 05-210,843), a method which comprises irradiating a coating material with an ultrasonic wave at practically the same position as a part to be coated owing to the use of an extrusion coating device having an ultrasonic wave oscillating part incorporated in a die coater thereof (JP laid-open Hei. 04-108,561), and a method which comprises exerting an ultrasonic oscillation to a coating material after the application of the coating material to a substrate and before the solidification of the applied coating material (JP publication Hei. 01-59,027) have been proposed to date.

In recent years, the trend of magnetic recording media toward increasingly high recording density has been urging these media to use a magnetic powder possessing an increasingly fine particle diameter and increasingly high magnetic energy. When the magnetic powder of such a quality is thoroughly dispersed in a given magnetic coating material, it tends to agglomerate again while the magnetic coating material is awaiting the time of its application to a given substrate. Thus, the magnetic powder has the disadvantage of incurring difficulty in acquiring prescribed properties. The aforementioned method which purports to solve the problem of this nature by supplying a magnetic coating material pretreated with an ultrasonic wave to a substrate has received no thorough study concerning the optimum manner of using a device for ultrasonic treatment, the optimum conditions for ultrasonic irradiation, and the optimum interval between the time the magnetic coating material is irradiated with the ultrasonic wave and the time the pretreated magnetic coating material is applied to the substrate. Thus, this magnetic coating material has the disadvantage of suffering dispersion of quality among the products emanating from the process of actual manufacture and failing the occurrence of the effect as expected. The method which involves the incorporation of an ultrasonic wave oscillating part in the die coater has the disadvantage of generating an undesirable oscillation between the coating solution and the web and, as a result, inducing such coating defects as uneven thickness of the coating material in the direction of coating because the irradiation of the ultrasonic wave occurs in unduly close proximity to the substrate. The method which involves the exertion of an ultrasonic oscillation on the layer of the magnetic coating material after being coated on a substrate is at a disadvantage in failing to effect thorough dispersion of an agglomerate caused by a hardening agent normally incorporated in a magnetic coating material.

This invention, created in the light of the true state of prior art mentioned above, has for an object the provision of a method for producing a magnetic recording medium excelling in squareness ratio, surface roughness, output, electromagnetic transducer characteristics, etc. by setting the optimum manner of using an ultrasonic treating device, the conditions for ultrasonic wave irradiation, etc., producing a magnetic coating material vested with an excellent ability to disperse therein a magnetic powder, particularly a ferromagnetic metallic powder of fine particle diameter and high magnetic energy, and render agglomeration of the dispersed magnetic powder difficult, and coating the produced magnetic coating material on a substrate.

SUMMARY OF THE INVENTION

The present inventors, with a view to accomplishing the object mentioned above, made a diligent study concerning the optimum manner of using a device for ultrasonic treatment, the optimum conditions for ultrasonic irradiation, and the optimum interval between the time the magnetic coating material is irradiated with the ultrasonic wave and the time the pretreated magnetic coating material is applied to the substrate. As a result, they found a method for pretreating a magnetic coating material thereby enabling the magnetic coating material to attain ideal dispersion therein of a magnetic powder contained therein and render agglomeration of the dispersed magnetic powder difficult. Specifically, this invention concerns a method for producing a magnetic recording medium by passing a magnetic coating material comprising a magnetic powder and a binder resin through an ultrasonic treating device under the operating conditions of 10 kHz to 200 kHz of frequency of oscillation and 10 to 100 μm of amplitude of ultrasonic wave thereby effecting ultrasonic wave treatment of the magnetic coating material and coating the treated magnetic coating material on a substrate either directly or through an undercoating layer, wherein the ultrasonic treating device comprises an ultrasonic wave treating tank adapted to effect ultrasonic wave treatment of the magnetic coating material under treatment by passing this material therethrough, an ultrasonic wave horn inserted into the ultrasonic wave treating tank and provided with an operating end surface capable of exerting an ultrasonic oscillation on the magnetic coating material, and an ultrasonic wave oscillator connected to a basal part side of the ultrasonic wave horn, an operating depth H defined by the distance from the operating end surface of the ultrasonic wave horn to a bottom wall surface of the ultrasonic wave treating tank opposed to the operating end surface is set at a magnitude in the range of 2 to 40 mm, and the magnetic coating material to be coated on the substrate is subjected to the ultrasonic wave treatment by the use of the device mentioned above with the duration of the irradiation of the ultrasonic wave kept in a range represented by the following formula (1):

$$H/6.6 \leq t \leq 3H \qquad \text{Formula (1)}$$

[wherein t stands for the duration (seconds) of irradiation of the ultrasonic wave and H stands for the operating depth (mm)].

In a preferred embodiment of this invention, the duration of irradiation of the ultrasonic wave mentioned above is set in a range represented by the following formula (1-2).

$$H/6.6 \leq t \leq 2H \qquad \text{Formula (1-2)}$$

In a preferred embodiment of this invention, the operating depth H mentioned above is set in a range of 2 to 30 mm.

In a preferred embodiment of this invention, an inner volume of an available dispersion chamber defined by an area of the operating end face of the ultrasonic wave horn and the operation depth is set in a range of 0.6 to 80 cm$^3$.

In a preferred embodiment of this invention, the magnetic coating material treated by the ultrasonic wave mentioned above is coated on a substrate directly or through an undercoating layer within a waiting time, Tw (minutes), satisfying the following formula (2).

$$0 < Tw \leq 26.5 t/H + 44 \qquad \text{Formula (2)}$$

(wherein t stands for the time (seconds) of irradiation with an ultrasonic wave and H stands for the operating depth (mm), and assumes a numerical value in the range of 2 to 40 mm).

In a preferred embodiment of this invention, the hardening agent is incorporated in the magnetic coating material prior to the treatment with the ultrasonic oscillation and the treatment with the ultrasonic oscillation is carried out within five hours following the incorporation of the hardening agent.

In a preferred embodiment of this invention, the method for coating by means of application the magnetic coating material subsequent to the treatment with the ultrasonic oscillation on the substrate is an extrusion nozzle coating method, a reverse roll coating method, or a gravure roll coating method.

In a preferred embodiment of this invention, the magnetic powder to be contained in the magnetic coating material mentioned above is a ferromagnetic metal powder containing 5 to 30% by weight of Co based on Fe and having a saturated amount of magnetization, $\sigma_s$, 125 emu/g and over and an average length of major axis of 0.15 μm and less.

In a preferred embodiment of this invention, the undercoating layer mentioned above is a magnetic layer comprising a nonferromagnetic powder and a binder resin.

In a preferred embodiment of this invention, the undercoating layer mentioned above is a nonmagnetic layer comprising a nonferromagnetic powder and a binder resin.

In a preferred embodiment of this invention, the undercoating layer is formed of a magnetic coating material for the formation of an undercoating grade magnetic layer comprising a ferromagnetic powder and a binder resin and the magnetic coating material has undergone an ultrasonic wave treatment under an ultrasonic wave treating conditions falling within the ranges mentioned above.

In a preferred embodiment of this invention, the undercoating layer mentioned above is formed of a coating material for the formation of an undercoating layer comprising a nonferromagnetic powder and a binder resin and the coating material has undergone an ultrasonic wave treatment under an ultrasonic wave treating conditions falling within the ranges mentioned above.

In a preferred embodiment of this invention, the nonmagnetic powder mentioned above is carbon black or α-iron oxide.

According to this invention, since the optimum manner of using an ultrasonic treating device, the conditions for irradiation of an ultrasonic wave, etc. are set as described above, a magnetic coating material endowed with an ability to effect perfect dispersion of a magnetic powder contained therein and render agglomeration of the dispersed magnetic powder difficult can be produced and, as a result, a magnetic recording medium excelling in squareness ratio, surface roughness, output. electromagnetic transducer properties, etc. can be obtained.

DETAILED DESCRIPTION OF THE INVENTION

Now, the method of this invention for the production of a magnetic recording medium will be described in detail below.

Figure 1:
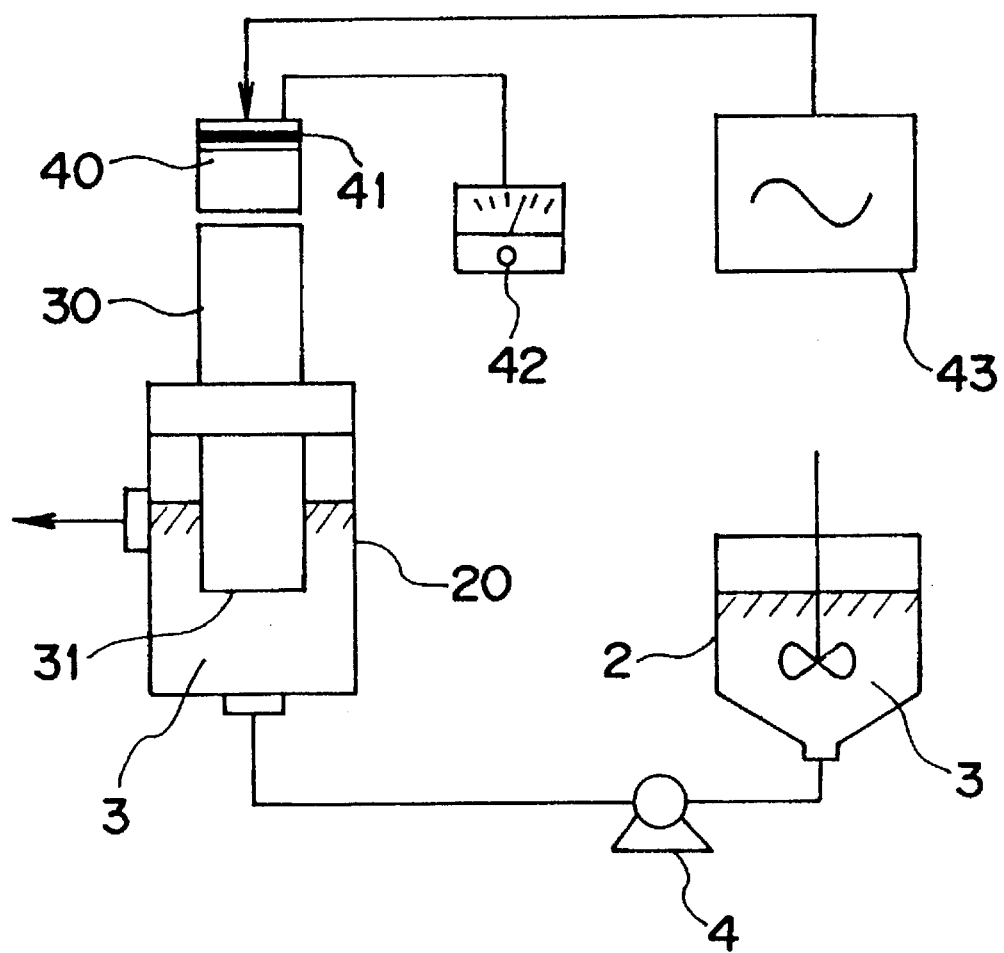
FIG. 1 is a schematic cross section of an ultrasonic treating device for use in this invention.

First, an ultrasonic treating device to be used in the method of this invention for the production of a magnetic recording medium will be explained with reference to FIG. 1. As shown in FIG. 1, an ultrasonic treating device 10 is provided with an ultrasonic wave treating tank 20 adapted to perform an ultrasonic wave treatment on a magnetic coating material 3 under treatment by causing the material 3 to pass therethrough, an ultrasonic wave horn 30 adapted to exert an ultrasonic oscillation on the magnetic coating material 3 inserted into the ultrasonic wave treating tank 20, and an ultrasonic wave oscillator 40 connected to the basal part side of the ultrasonic wave horn 30. An ultrasonic wave generator 43 is connected to the ultrasonic wave oscillator 40. Generally, an amplitude detector 41 is mounted on the ultrasonic wave oscillator 40 as connected thereto and an amplitude display 42 is connected to the amplitude detector 41. The ultrasonic wave treating tank 20 is allowed to communicate with a stirring tank 2 through the medium of a pump 4.

Figure 2:
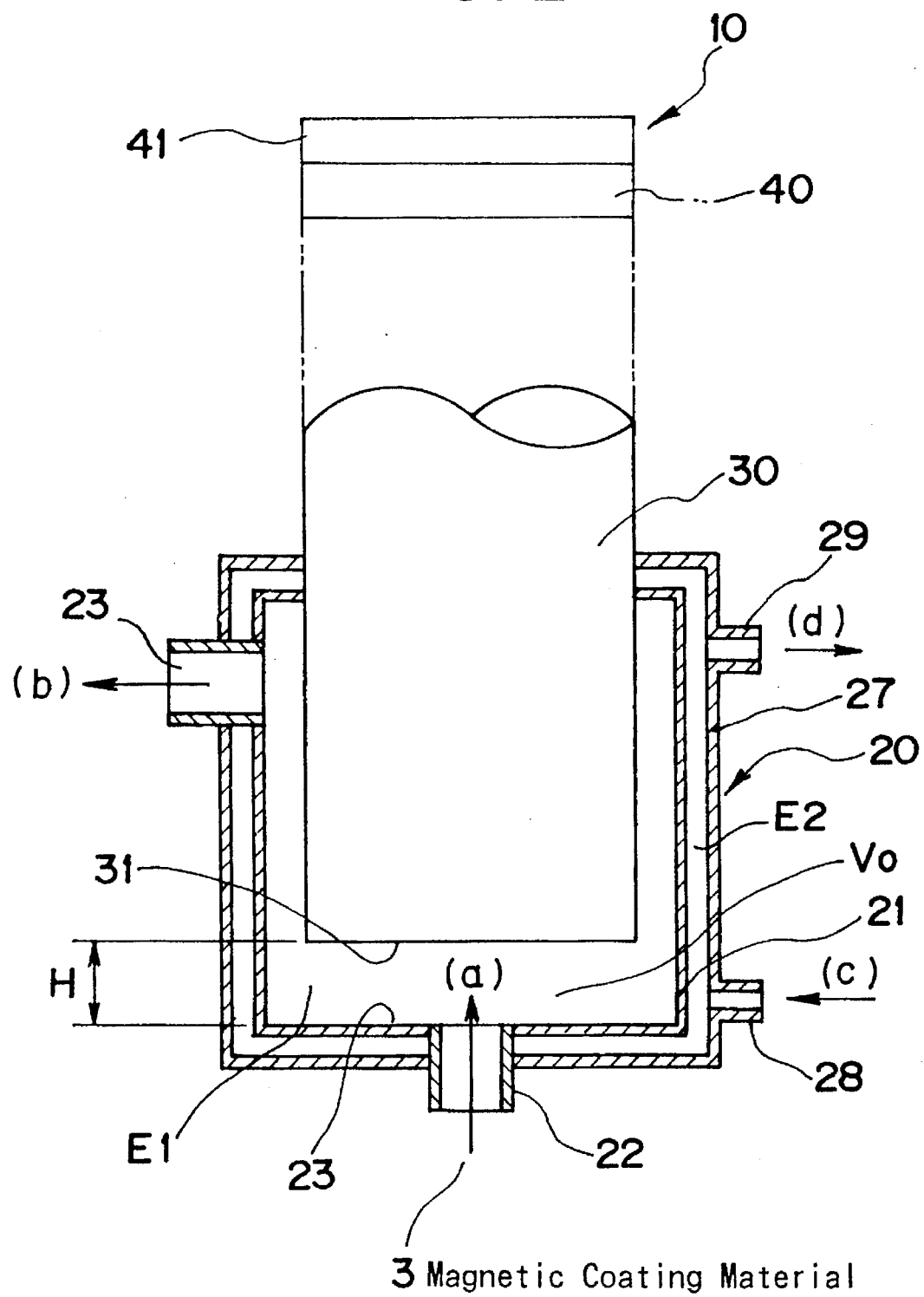
FIG. 2 is a schematic cross section of the essential part of the ultrasonic treating device for use in this invention.

The essential part of the ultrasonic treating device 10 particularly for the sake of setting the conditions for irradiation of an ultrasonic wave is shown in detail in FIG. 2.

As shown in FIG. 2, the ultrasonic wave treating tank 20 is provided with a cylindrical inner housing 21 for defining an empty space E1 to permit flow of the magnetic coating material and an outer housing 27 disposed outside the inner housing 21 and adapted to define an empty space E2 to permit flow of a coolant such as cooling water therethrough. The inner housing 21 is provided in the bottom part thereof with a magnetic coating material inlet 22 for introducing therein the magnetic coating material 3 under treatment and in the upper part thereof with a magnetic coating material outlet 23. Owing to this construction, the magnetic coating material 3 is allowed to flow continuously through the interior of the inner housing 21 [from the arrow (a) to the arrow (b)]. Though the cylindrical inner housing 21 has no particularly limited size, it generally has a diameter in the approximate range of 25 to 60 mm. The outer housing 27 is provided with an inlet 28 and an outlet 29 for the coolant such as cooling water for the purpose of allowing circulation of the coolant therethrough [from the arrow (c) to the arrow (d)]. This outer housing 27 may be omitted when necessary.

The ultrasonic wave horn 30 which is inserted into the ultrasonic wave treating tank 20 (particularly the inner housing 21) is provided with an operating end surface 31 (the leading end part of horn) adapted to exert an ultrasonic oscillation on the magnetic coating material. The operating depth H which is defined by the distance from the operating end surface 31 of the ultrasonic wave horn 30 to a bottom wall surface (a bottom wall surface of the inner housing 21) 23 of the ultrasonic wave treating tank 20 opposed to the operating end surface 31 is set in a range of 2 to 40 mm. preferably 2 to 30 mm. The volume of an available dispersion chamber, $V_0$, which is defined by the area S of the operating end surface 31 of the ultrasonic wave horn 30 and the operating depth H, though more or less variable with the scale of the ultrasonic wave treating tank 20, is appropriately in the range of 0.6 to 80 $cm^3$, more appropriately 0.9 to 60 $cm^3$. If the operating depth H mentioned above is less than 2 mm, there will arise such disadvantages as extreme erosion of the operating end surface 31 of the ultrasonic wave horn 30 or the bottom wall surface (bottom wall surface of the inner housing 21) 23 of the ultrasonic wave treating tank opposed to the operating end surface 31 due to the ultrasonic oscillation, abrupt rise of liquid temperature, extreme increase of pressure inside the volume of the available dispersion chamber $V_0$, and excessive dispersion. If the operating depth H is over 40 mm, there will ensue such disadvantages as relatively longer time of irradiation of an ultrasonic wave and lack of uniformity of dispersion. If the volume of the available dispersion chamber $V_0$ is unduly small, there will arise the same disadvantages as are incurred when the operating depth H is unduly small. If the volume of the available dispersion chamber $V_0$ is unduly large, there will ensue the same disadvantages as are encountered when the operating depth H is unduly large.

The ultrasonic wave oscillator 40 is connected to the basal part side of the ultrasonic wave horn 30 which is provided with the operating end surface 31 of such nature as described above. The ultrasonic wave which is emitted from the ultrasonic wave oscillator 40 is transmitted through the ultrasonic wave horn 30 and delivered to the magnetic coating material via the operating end surface 31. Though the ultrasonic wave horn 30 has no particularly limited size, it generally has a diameter in the approximate range of 20 to 50 mm.

The conditions under which the ultrasonic wave treatment of this invention is carried out by the use of the ultrasonic treating device 10 constructed as described above are 10 kHz to 200 kHz of frequency of oscillation, 10 to 100 μm of amplitude of the ultrasonic wave of the operating end face 31, and such a time of irradiation of ultrasonic wave (which will be defined more specifically herein below) as falls in the range represented by the following formula (1).

$$H/6.6 \leq t \leq 3H \qquad \text{Formula (1)}$$

In the formula (1), t stands for the time (seconds) of irradiation of ultrasonic wave and H stands for the operating depth (mm). Within the range of this formula (1), the time t (seconds) of irradiation of ultrasonic wave is more preferably in the range of $H/6.6 \leq t \leq 2H$.

if the frequency of oscillation and the amplitude mentioned above deviate from the relevant prescribed ranges, a magnetic coating material allowing ideal dispersion of a magnetic powder and only sparingly suffer agglomeration of the dispersed magnetic powder is not obtained by the irradiation of the ultrasonic wave performed within a time satisfying the formula (1) mentioned above. Even when the frequency of oscillation and the amplitude fall in the relevant prescribed ranges mentioned above, a magnetic coating material which allows ideal dispersion of a magnetic powder therein and only sparingly suffers agglomeration of the dispersed magnetic powder is not obtained if the time t of irradiation of ultrasonic wave is smaller than the lower limit of the range represented by the formula (1) above, i.e. less than (H/6.6) seconds. If the time t of irradiation of ultrasonic wave exceeds the upper limit of the range of the formula (1) mentioned above, namely (3H) seconds, the excess time will adversely affect the electromagnetic transducer properties and the physical properties. Further, this excess will inevitably require a plurality of such devices of the aforementioned construction to be used for the treatment and entail an immense addition to the cost of equipment and a sacrifice of economy. Moreover, the effects brought about by the excess time as in the dispersion of the magnetic powder are not commensurate with the cost to be incurred consequently. In the conditions for the ultrasonic wave treatment of this invention, the pressure is appropriately in the range of 0.01 to 8 $kgf/cm^2$ (gauge pressure), preferably in the range of 0.1 to 4 $kgf/cm^2$ (gauge pressure). The pressure exists during the irradiation of the ultrasonic wave because the mutually abutting parts of the ultrasonic wave horn 30 and the inner housing 21 are so tightly joined as to preclude occurrence of a gap and the inner housing 21 constitutes a closed system except for the inlet and the outlet for the magnetic coating material.

The definition of the time of irradiation of the ultrasonic wave in this invention will be described with respect to the treatment of passage shown in FIG. 3 and with respect to the treatment of circulation shown in FIG. 4.

Figure 3:
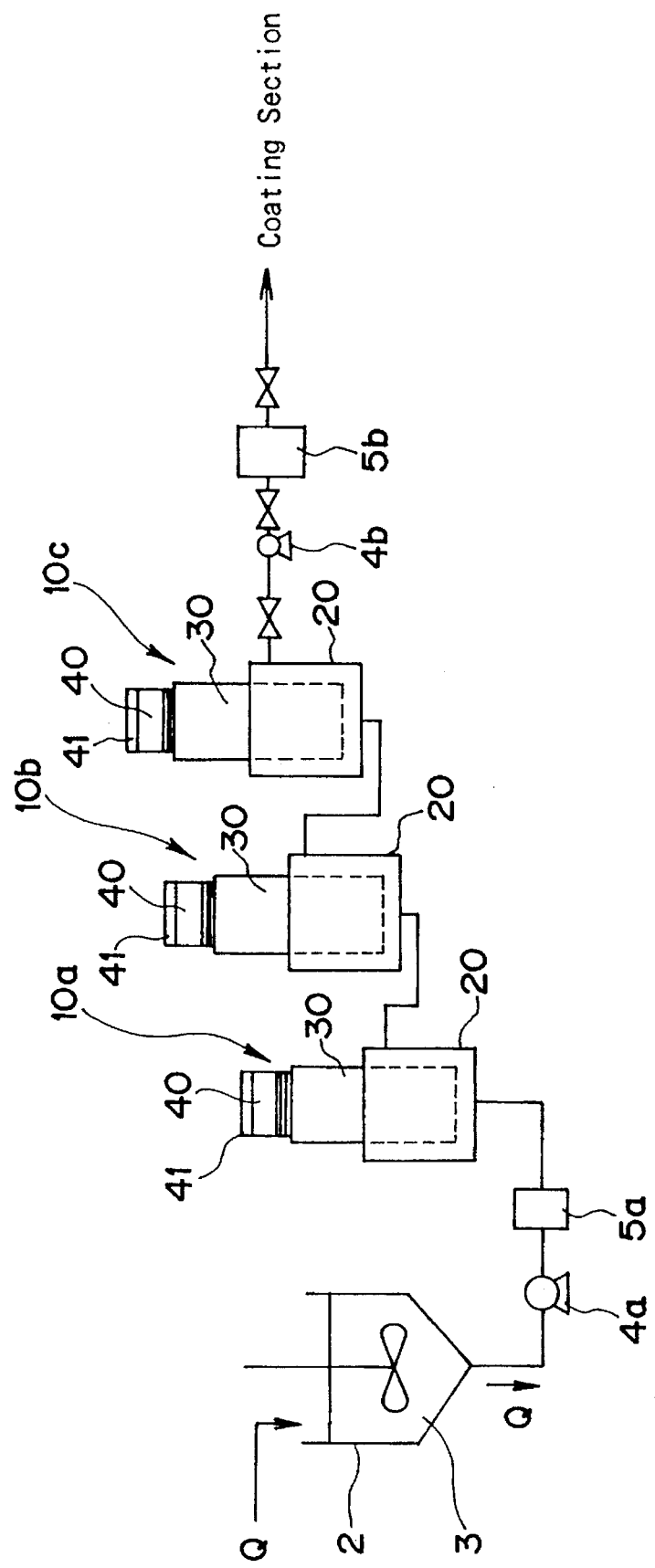
FIG. 3 is a schematic process diagram showing an ultrasonic wave treatment which is effected by means of passing the material under treatment through the treating device.

FIG. 3 illustrates an apparatus for the treatment by passage which is formed by series connection of three ultrasonic treating devices 10 of the construction of FIG. 2 (10a, 10b, and 10c). As shown in this diagram, the magnetic coating material 3 which is fed out at a flow volume Q (liter/sec) from the tank 2 is passed through first, second, and third ultrasonic treating devices 10a, 10b, and 10c via a pump 4a and a filter 5a and ultimately forwarded via a pump 4b and a filter 5b to a coating section. Let $V_{oa}$, $V_{ob}$, and $V_{oc}$ (invariably by the unit of liter) stand for the respective volumes of available dispersion chambers of the first, second, and third ultrasonic treating devices 10a, 10b, and 10c in this case, the total time t of irradiation of ultrasonic wave will be expressed by the formula, $t=V_{oa}/Q+V_{ob}/Q+V_{oc}/Q$. If the first ultrasonic treating device 10a alone is used for the treatment, then this time will be naturally expressed by the formula, $t=V_{oa}/Q$. When the time t of irradiation of ultrasonic wave, the number of ultrasonic treating devices to be used, and the volume of available dispersion chamber are fixed, it suffices only to adjust the flow volume Q of the magnetic coating material 3 so as to obtain the time t of irradiation of ultrasonic wave as aimed at. In the case of this treatment by passage, the irradiation of ultrasonic wave from the ultrasonic treating devices can be carried out continuously. FIG. 4 illustrates a series apparatus for the treatment by circulation according to the treatment of circulation by the use of the ultrasonic treating device shown in FIG. 2. For the sake of facilitating comprehension of the treatment by circulation, the part of FIG. 4 which is enclosed with a FRAME of a line of alternating one-long and two-short dashes will be exclusively taken into consideration. A magnetic coating material 3a drawn out through the bottom part of a tank 2a is branched in the direction of an arrow (I) and the direction of an arrow (II) by a three-way valve 7a. The magnetic coating material which has been branched in the direction of the arrow (I) is forwarded via the pump 4a to the ultrasonic treating device 10a, subjected to an ultrasonic treatment therein, and returned to the tank 2a. In short, the magnetic coating material is given a treatment by circulation. Meanwhile, the magnetic coating material which has been branched in the direction of the arrow (II) is advanced in the direction of an arrow (III) via a pump 4b, the filter 5a, and a three-way valve 7b, and returned to the tank 2a. At this time, the three-way valve 7b is so manipulated as to prevent the magnetic coating material from flowing in the direction of an arrow (IV). In short, the magnetic coating material is circulated around the tank 2a as the center. In this case, the time t (sec) of irradiation of ultrasonic wave is expressed by the formula, $t=V_{oa} \cdot T/V1$, wherein V1 (liter) stands for the volume of the magnetic coating material stored in advance in the tank 2a, $V_{oa}$ for the volume of available dispersion chamber (by the unit of liter) of the ultrasonic treating device 10a, and T for the total time (sec) of circulation of the magnetic coating material. The operation under discussion will be described a little more specifically below by citing numerical values. It is plain that where $V_{oa}$ is set at 0.1 liter and V1 at 10 liters, for example, the total time T of circulation must be set at 100 sec. for the purpose of obtaining 1 sec. for the time t of irradiation of ultrasonic wave. As inferred from this example of calculation, on the assumption that the volume $V_{oa}$ of available dispersion chamber of the ultrasonic treating device 10a is fixed, the total time T of circulation for obtaining 1 sec. for the time t of irradiation of ultrasonic wave must be increased in proportion as the volume V1 (liter) of the magnetic coating material to be stored in advance in the tank 2a is increased.

The magnetic coating material which is given the ultrasonic treatment for a prescribed time as being circulated for a prescribed total time T as described above is generally stored temporarily in the tank 2a. During this temporary storage, the magnetic coating material is not circulated. Thereafter, the magnetic coating material in the tank 2a is supplied exclusively in the direction of the arrow (IV) by the manipulation of the three-way valve 7b and put to storage in the tank 2b. Then, the magnetic coating material stored in the tank 2b is generally forwarded exclusively in the direction of an arrow (VI) by the manipulation of a three-way valve 7c, advanced via a pump 4d and the filter 5b, further forwarded in the direction of an arrow (VIII) by the manipulation of a three-way valve 7d, and delivered via a pump 4e and a filter 5c to the coating section for the production of a magnetic recording medium.

The magnetic coating material stored in the tank 2b is occasionally branched in the direction of an arrow (V) by the manipulation of the three-way valve 7c. This is because there are times when the magnetic coating material is forwarded via the pump 4c to the ultrasonic treating device 10b and optionally subjected to an ultrasonic treatment therein. There are also times when the magnetic coating material is branched in the direction of an arrow (VII) by the manipulation of the three-way valve 7d and then returned partly to the tank 2b.

The magnetic coating material which has not undergone an ultrasonic treatment is suitably supplied by way of replenishment from above the tank 2a of FIG. 3, though not shown in the diagram.

The magnetic coating material which has undergone the ultrasonic treatment as described above is supplied to the coating part and deposited by coating on the substrate. In this case, let Tw (minute) stand for the waiting time which intervenes between the time the magnetic coating material receives an ultrasonic treatment and the time it is deposited by coating on the substrate, and the magnetic coating material which has undergone the ultrasonic treatment will have to be deposited by coating on the substrate within the span of the waiting time Tw (minute) which satisfies the following formula (2).

$$0<Tw \leq 26.5t/H+44 \qquad \text{Formula (2)}$$

(wherein t stands for the time (second) of irradiation of ultrasonic wave and H stands for the operating depth (mm) and, at the same time, assumes a numerical value in the range of 2 to 40 mm).

If the waiting time Tw (minute) exceeds the upper limit of the range mentioned above, the magnetic coating material in a dispersed state will agglomerate and the prescribed effect of the ultrasonic treatment will not be obtained as expected.

There are times when the hardening agent is incorporated in the magnetic coating material before the ultrasonic treatment is performed on the magnetic coating material. In this case, the ultrasonic treatment must be carried out within five hours which follow the incorporation of the hardening agent in the magnetic coating material. If the ultrasonic treatment is carried out after the elapse of the prescribed time of five hours, it will be at a disadvantage in failing to redisperse thoroughly the clusters of magnetic powder agglomerated by the action of the hardening agent or to produce the prescribed effect aimed at.

Now, the magnetic coating material to be used in the method of this invention for the production of a magnetic recording medium will be described below. The magnetic coating material contains a ferromagnetic powder, a binder resin, and a solvent as main components thereof.

As concrete examples of the ferromagnetic powder to be used for the magnetic coating material, ferromagnetic iron oxide powder, ferromagnetic metal powder, platelet hexagonal ferrite, and chromium dioxide may be cited.

As concrete examples of the ferromagnetic iron oxide powder, $\gamma\text{-Fe}_2\text{O}_3$, $\text{Fe}_3\text{O}_4$, solid solution of $\gamma\text{-Fe}_2\text{O}_3$ with $\text{Fe}_3\text{O}_4$, Co compound-coated $\gamma\text{-Fe}_2\text{O}_3$, Co compound-doped $\gamma\text{-Fe}_2\text{O}_3$, Co compound-coated $\text{Fe}_3\text{O}_4$, Co compound-doped $\text{Fe}_3\text{O}_4$, solid solution of Co compound-coated $\gamma\text{-Fe}_2\text{O}_3$ with Co compound-coated $\text{Fe}_3\text{O}_4$, and solid solution of Co compound-doped $\gamma\text{-Fe}_2\text{O}_3$ with Co compound-doped $\text{Fe}_3\text{O}_4$ may be cited. The term "Co compound" as used herein refers to such compounds as cobalt oxide, cobalt hydroxide, cobalt ferrite, and cobalt ion-adsorbed substances which utilize the magnetic anisotropy of cobalt for enhancing the coercive force. In the use of a Co-coated or -doped $\gamma\text{-Fe}_2\text{O}_3$, the ratio of ferrous ion to ferric ion is appropriately in the range of 0 to 20%, and preferably in the range of 2 to 10%.

As concrete examples of the ferromagnetic metal powder, Fe, Ni, Co, and alloys thereof may be cited. When those compounds which have as main components thereof such ferromagnetic metal elements as α—Fe, Fe—Co, Fe—Ni, Fe—Co—Ni, Co, and Co—Ni are used, they appropriately contain 70% and over, preferably 75% and over, by weight of a metal (Fe, Co, or Ni) or an alloy thereof. In the case of a magnetic powder of ferromagnetic metal which has Fe as a main component and further contains at least Co, the amount of the Co atom is appropriately in the range of 5 to 40%, preferably 6 to 35%, by weight based on the amount of the Fe atom. Advantageously, a ferromagnetic metal powder which has Fe and/or Co as a main component additionally contain rare earth elements including Y. Optionally, such a ferromagnetic metal powder as mentioned above may be particles having the surface thereof coated with an oxide layer, partially carbonized or nitrided particles, or particles having the surface thereof coated with a carbonaceous layer. This ferromagnetic metal powder may contain a small amount of a hydroxide or an oxide. The ferromagnetic metal powder to be used in this invention can be obtained by any of the well-known methods such as, for example, a method which comprises reducing an organic acid salt (mainly oxalic acid salt) of a ferromagnetic metal with such a reducing gas as hydrogen, a method which comprises reducing with such a reducing gas as hydrogen either hydrated iron oxide or iron oxide obtained by heating hydrated iron oxide, a method which comprises thermally decomposing a metal carbonyl compound, a method which comprises reducing the aqueous solution of a ferromagnetic alloy by the use of such a reducing agent as sodium boron hydride, a hypophosphite, or hydrazine, and a method which comprises vaporizing a metal in an inert gas kept at a lowered pressure thereby converting it into a fine powder. Optionally, the ferromagnetic metal powder thus obtained may be subjected, prior to use, to any of the well-known methods for gradual oxidation such as, for example, a method which comprises soaking the powder in an organic solvent and then drying the wet powder, a method which comprises soaking the powder in an organic solvent, blowing an oxygen-containing gas into the bath thereby coating the surface of particles of the powder with an oxide film, and then drying the wet powder, and a method which comprises forming an oxide layer on the surface of particles of the powder by adjusting the partial pressures of oxygen gas and an inert gas without using an organic solvent.

The platelet hexagonal ferrite is a ferromagnetic powder consisting of hexagonal plates whose axes of easy magnetization lie perpendicularly to the relevant plates. As concrete examples of the platelet hexagonal ferrite, Ba-ferrite, Sr-ferrite, Pb-ferrite, Ca-ferrite, ferrites substituted by a metallic atom possessing a valency equaling the total of valencies of relevant Fe atoms, and hexagonal Co powder. More specifically, magneto-plumbite type Ba-ferrite and Sr-ferrite and such magneto-plumbite type Ba-ferrite and Sr-ferrite as partially contain a spinel phase may be cited. Such ferrites as are substituted by a metallic atom possessing a valency equaling the total of valencies of relevant Fe atoms for the purpose of controlling the coercive force of Ba-ferrite or Sr-ferrite prove particularly advantageous. The metallic atoms appropriately usable for the substitution which is aimed at controlling the coercive force include Co—Ti, Co—Ti—Sn, Co—Ti—Zr, Cu—Zn, Cu—Ti—Zn, Ni—Ti—Zn, etc., for example. When the Ba-ferrite is used, the term "plate diameter" refers to the width of the individual hexagonal plate-like particles of the powder and it is measured with the aid of an electron microscope. The plate diameter is in the approximate range of 0.01 to 0.1 µm and the plate thickness is normally in the approximate range of ½ to 1/20 of the diameter.

The magnetic powder may be a ferromagnetic $CrO_2$ powder consisting of acicular particles.

All the ferromagnetic powders mentioned above are allowed to incorporate therein a small amount of any of such elements as Al, Si, Cr, Mn, Co, Ni, Zn, Cu, Zr, Ti, Bi, Ag, Pt, B, C, P, N, Y, S, Sc, V, Mo, Rh, Pd, Ag, Sn, Sb, Te, Ba, Ca, Ta, W, Re, Au, Hg, Pb, La, Sr, and rare earth elements. The incorporation of Al, Si, P, Y, or a rare earth element, among other elements cited above, brings about the effect of improving particle size distribution and preventing the phenomenon of sintering.

These ferromagnetic powders may be coated with a layer of Al, Si, P, or an oxide thereof or may be given a surface treatment with a coupling agent such as Si, Al, or Ti or with a varying surfactant.

Some, if not all, of the ferromagnetic metal powders contain such a water-soluble inorganic ion as Na, K, Ca, Fe, or Ni. The content of the inorganic ion is appropriately 500 ppm and less.

These ferromagnetic powders may be treated, prior to dispersion, with a dispersant, a lubricant, a surfactant, an antioxidant, etc. which will be more specifically described herein below.

The water content of the ferromagnetic powder is appropriately in the range of 0.1 to 2%. Preferably, it is optimized, depending on the kind of binding agent to be used.

The ferromagnetic powder advantageously has the pH value thereof optimized in the range of 4 to 12, preferably 6 to 10, by virtue of the combination thereof with the binder resin to be used.

The ferromagnetic powder has a specific surface area in the range of 25 to 80 $m^2/g$, preferably 40 to 70 $m^2/g$, as determined by the BET (Brunauer-Emmett-Teller) method. If the specific surface area is less than 25 $m^2/g$, the magnetic recording medium to be produced will suffer from unduly high noise. If it exceeds 80 $m^2/g$, the magnetic recording medium will not easily acquire fully satisfactory surface property.

The ferromagnetic powder generally is contained in an amount in the range of 100 to 2,000% by weight, based on 100% by weight of the binder. The content of the magnetic powder in the magnetic layer is in the range of 50 to 95% by weight, preferably 55 to 90% by weight, based on the total amount of the magnetic layer. If the content of the magnetic powder is unduly large, the magnetic layer will tend to incur defects such as unduly low durability because the amount of resin and other additives in the magnetic layer is decreased proportionately. If this content is unduly small, the magnetic layer will be unable to produce a high regenerating output.

The ferromagnetic powders enumerated above by way of example may be used either singly or in the form of a mixture of two or more members.

When a ferromagnetic powder of ferromagnetic metal containing 5 to 40% by weight of Co based on the amount of Fe and having an amount of saturated magnetization, $\sigma_s$, of 125 emu/g and over (particularly in the range of 125 to 170 emu/g) and an average length of major axis of 0.15 µm and less (particularly in the range of 0.04 to 0.15 µm), among other magnetic powders, is used, the effect of the ultrasonic treatment contemplated by the present invention is conspicuously manifested particularly from the viewpoint of properties of recording medium.

The binder resins which are appropriately used in the magnetic coating material include thermoplastic resins, thermo-setting or reactive resins, and electron beam-sensitive modified resins, for example. These resins are selected and used as combined optionally to suit the properties of the medium and the conditions of process of manufacture.

The thermoplastic resin has a softening temperature of 150° C. and less, an average molecular weight in the approximate range of 5,000 to 200,000, and a polymerization degree in the approximate range of 50 to 2,000. The thermosetting resin, the reactive resin, or the electron beam-sensitive modified resin has the same average molecular weight and polymerization degree as the thermoplastic resin and, when heated and/or irradiated with an electron beam after the steps of coating, drying, and calendering, undergoes such a reaction as condensation or addition and acquires an infinite molecular weight.

Among other combinations of these resins, such combinations of vinyl chloride type copolymers with polyurethane resin are used particularly advantageously.

Vinyl chloride type copolymers appropriately have a vinyl chloride content in the range of 60 to 95%, preferably 60 to 90%, by weight and an average polymerization degree in the approximate range of 100 to 500.

The vinyl chloride type resins which answer the description include vinyl chloride-vinyl acetate-vinyl alcohol copolymer, vinyl chloride-hydroxyalkyl(meth)acrylate copolymer, vinyl chloride-vinyl acetate-maleic acid copolymer, vinyl chloride-vinyl acetate-vinyl alcohol-maleic acid copolymer, vinyl chloride-vinyl acetate-hydroxyalkyl-(meth)acrylate copolymer, vinyl chloride-vinyl acetate-hydroxyalkyl(meth)acrylate-maleic acid copolymer, vinyl chloride-vinyl acetate-vinyl alcohol-glycidyl(meth)acrylate copolymer, vinyl chloride-hydroxyalkyl-(meth)acrylate-glycidyl(meth)acrylate copolymer, vinyl chloride-vinyl acetate-vinyl alcohol-glycidyl(meth)acrylate-allyl glycidyl ether copolymer, and vinyl chloride-vinyl acetate-vinyl alcohol-allyl glycidyl diether copolymer, for example. Among copolymers mentioned above, copolymers of vinyl chloride with such monomers as contain an epoxy(glycidyl) group prove particularly advantageous. Appropriately these vinyl chloride type copolymers contain a sulfuric acid group and/or a sulfo group as a polar group (hereinafter referred to as S-containing polar group). In the S-containing polar groups (—$SO_4Y$, —$SO_3Y$), Y may be H or an alkali metal. Particularly preferably, these groups are —$SO_4K$ and —$SO_3K$ which have K for Y. The vinyl chloride type copolymers under discussion may contain either or both of the S-containing polar groups. When both of them are contained, the ratio thereof may be arbitrary.

These S-containing polar groups are appropriately contained in an amount in the range of 0.01 to 10%, preferably 0.1 to 5%, by weight as S atoms in the molecule.

As polar groups, —$OPO_2Y$ group, —$PO_3Y$ group, —COOY group (wherein Y stands for H or an alkali metal), amino group (—$NR_2$), or —$NR_3Cl$ (wherein R stands for H, methyl, or ethyl) may be contained, as occasion demands, besides the S-containing polar group.

Among other groups mentioned above, the amino group need not be used in combination with the aforementioned S and may be in a varying kind. A dialkylamino group (preferably having an alkyl of one to ten carbon atoms) proves particularly appropriate.

The amino group of this nature is generally obtained by means of amine modification. Specifically, it is obtained by dispersing or dissolving a copolymer of vinyl chloride with an alkylcarboxylic vinyl ester in such an organic solvent as an alcohol, adding to the resultant dispersion or solution an amine compound (such as primary, secondary, or tertiary amine as aliphatic amine, alicyclic amine, alkanol amine, or alkoxyalkyl amine) and an epoxy group-containing compound intended to facilitate saponification, and subjecting the reactants to saponification. The amino group-containing vinyl unit is contained in an amount in the range of 0.05 to 5% by weight and it may ultimately contain an ammonium base.

The resin skeleton which is bound by the S-containing polar group is a vinyl chloride type resin. It can be obtained by polymerizing vinyl chloride, a monomer containing an epoxy group, or optionally other monomer copolymerizable therewith in the presence of such a radical generator as potassium persulfate or ammonium persulfate which possesses an S-containing strong acid radical. The amount of the radical generating agent to be used is generally in the range of 0.3 to 9.0%, preferably 1.0 to 5.0%, by weight based on the amount of the monomer. Since the present polymerization system is mostly soluble water, the polymerization is appropriately carried out in the form of emulsion polymerization, suspension polymerization using such an alcohol as methanol as a polymerization medium, or solution polymerization using a ketone as a solvent.

In this case, a radical generating agent which is generally used in the polymerization of vinyl chloride can be used in addition to the radical generating agent possessing an S-containing strong acid radical.

It is also permissible to use the radical generating agent possessing an S-containing strong acid radical in combination with such a reducing agent as formaldehyde sodium sulfoxylate, sodium sulfite, or sodium thiosulfate.

As concrete examples of the epoxy group-containing monomer, glycidyl ethers of unsaturated alcohols such as (meth)allyl glycidyl ether, glycidyl esters of (meth)acrylic acid such as glycidyl (meth)acrylate, glycidyl esters of unsaturated acids such as glycidyl-p-vinyl benzoate, methylglycidyl itaconate, glycidylethyl maleate, glycidylvinyl sulfonate, and glycidyl (meth)allyl sulfonate, and epoxide olefins such as butadiene monoxide, vinylcyclohexene monoxide, and 2-methyl-5,6-epoxyhexene may be cited. Generally, this monomer is used in such an amount that the content of epoxy group in the copolymer is 0.5% and over by weight.

As concrete examples of the monomer which is optionally used in addition to vinyl chloride and an epoxy group-containing monomer, carboxylic vinyl esters such as vinyl acetate and vinyl propionate, vinyl ethers such as methylvinyl ether, isobutylvinyl ether, and cetylvinyl ether, vinylidenes such as vinylidene chloride and vinylidene fluoride, unsaturated carboxylic esters such as diethyl maleate, butylbenzyl maleate, di-2-hydroxyethyl maleate, dimethyl itaconate, methyl (meth)acrylate, ethyl (meth)acrylate, lauryl (meth)acrylate, and 2-hydroxypropyl (meth)acrylate, olefins such as ethylene and propylene, and unsaturated nitriles such as (meth)acrylonitrile may be cited.

The polyurethane resin which is used in combination with such a vinyl chloride type resin as mentioned above has the advantage of particularly excelling in wear resistance and adhesiveness to a substrate. It appropriately contains a polar group or a hydroxyl group in the side chain thereof. A polyurethane resin which possesses a polar group containing sulfur or phosphorus proves particularly appropriate.

The polyurethane resin is the general term for those resins which are obtained by the reaction of hydroxy group-containing resins such as polyester polyols and/or polyether polyols with a polyisocyanate-containing compound. The resin results from the polymerization of such synthetic raw materials as will be more fully described herein below until a number average polymer weight reaches a level in the approximate range of 500 to 200,000. The Q value (weight average molecular weight (Mw)/number average molecular weight (Mn)) of the resin is in the approximate range of 1.5 to 4.

The polyurethane resin appropriately contains at least two species of polyurethane resin having glass transition points, Tg, differing from each other and yet falling in the range, $-20°C. \leq Tg \leq 80°C.$, in a combined amount in the range of 10 to 90% by weight, based on the amount of the binder resin. The use of the plurality of species of polyurethane resin has the advantage of manifesting running stability, calender formability, and electromagnetic transducer properties in balanced magnitudes.

The vinyl chloride type copolymer and the urethane resin containing an S- and/P-containing polar group are advantageously used as combined at a gravimetric ratio in the range of 10:90 to 90:10.

These resins are allowed to contain additionally any of various known resins in an amount of not more than 20% by weight, based on the total amount of the resins.

In the raw materials for the urethane resin, as concrete examples of the hydroxyl group-containing resin, polyalkylene glycols such as polyethylene glycol, polybutylene glycol, and polypropylene glycol, alkylene oxide adducts such as bis-phenol A, various species of glycol, and polyester polyols possessing a hydroxyl group at a terminal of molecular chain may be cited.

As concrete examples of the carboxylic acid component of the polyester polyol, aromatic dicarboxylic acids such as terephthalic acid, isophthalic acid, orthophthalic acid, and 1,5-naphthalic acid, aromatic oxycarboxylic acids such as p-oxybenzoic acid and p-(hydroxyethoxy)benzoic acid, aliphatic dicarboxylic acids such as succinic acid, adipic acid, azelaic acid, sebacic acid, and dodecanedicarboxylic acid, unsaturated fatty acids such as fumaric acid, maleic acid, itaconic acid, tetrahydrophthalic acid, and hexahydrophthalic acid, alicyclic dicarboxylic acids, and tri- and tetra-carboxylic acids such as trimellitic acid, trimesic acid, and pyromellitic acid may be cited.

As concrete examples of the glycol component of the polyester polyol, ethylene oxide adducts and propylene oxide adducts such as ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, and bis-phenol A, ethylene oxide and propylene oxide adducts of his-phenol A hydride, polyethylene glycol, polypropylene glycol, and poly-tetramethylene glycol may be cited. These glycol moieties may be used in combination with such tri- and tetra-ols as trimethylol ethane, trimethylol propane, glycerin, and penta-erythritol.

Such lactone type polyester diols as are obtained by subjecting such lactones as caprolactone to ring-opening polymerization may be cited as other examples of the polyester polyol.

As concrete examples of the polyisocyanate which is usable herein, diisocyanate compounds as tolylene diisocyanate, phenylene diisocyanate, diphenyl methane diisocyanate, hexa-methylene diisocyanate, tetramethylene diisocyanate, naphthalene diisocyanate, isophorone diisocyanate, xylylene diisocyanate, diisocyanate trimethyl cyclohexane, diisocyanate cyclohexyl methane, dimethoxybiphenylene diisocyanate, and diisocyanate diphenyl ether, and triisocyanate compounds such as trimers of 7 mol % and less of tolylene diisocyanate in all the isocyanate groups and trimers of hexamethylene diisocyanate may be cited.

As concrete examples of the polar group which is contained in the resins mentioned above, S-containing groups such as —$SO_3M$ and —$SO_4M$, P-containing polar groups such as =$PO_3M$, =$PO_2M$, =POM, —P=O(OM1)(OM2), and —OP=O(OM1)(OM2), —COOM, —$NR_4X$ (wherein M, M1, and M2 independently stand for t, Li, Na, K, —$NR_4$, or —$NHR_3$, R stands for an alkyl group or H, and X stands for a halogen atom), —OH, —$NR_2$, —$N^+R_3$ (wherein R stands for a hydrocarbon group), epoxy group, —SH, and —CN may be cited. At least one polar group selected from the group consisting of the polar groups enumerated above is appropriately incorporated in the resin by means of copolymerization or addition reaction. As the substituent M, Na is used particularly advantageously. The polar group is appropriately contained in the resin in an amount in the range of 0.01 to 10% preferably 0.02 to 3%, by weight as atoms in the molecule. This polar group may be present in the main chain or in the branch of the skeleton resin.

The urethane resin under discussion is obtained by causing a specific polar group-containing compound and/or a raw material containing a raw material resin resulting from the reaction with a specific polar group-containing compound to react in the presence or absence of a solvent in accordance with the known method.

As concrete examples of the other thermoplastic resin, (meth)acrylic resin, polyester resins, acrylonitrile-butadiene type copolymers, polyamide resin, polyvinyl butyral, nitrocellulose, styrene-butadiene type copolymers, polyvinyl alcohol resin, acetal resin, epoxy type resins, phenoxy type resins, polyether resin, polycaprolactone and other polyfunctional polyethers, polyamide resin, polyimide resin, phenol resin, polybutadiene elastomer, chloride rubber, acryl rubbers, isoprene rubber, and epoxy-modified rubbers may be cited.

As concrete examples of the thermosetting resin, phenol resin, epoxy resin, polyurethane curing type resin, urea resin, butyral resin, formal resin, melamine resin, alkyd resin, silicone resin, acryl type reaction resin, polyamide resin, epoxy-polyamide resin, saturated polyester resins, and urea formaldehyde resin may be cited.

In the copolymers mentioned above, those which possess a hydroxyl group at a terminal or in a side chain are favorably used as reaction type resins because they allow easy use of crosslinkage with an isocyanate or modification by electron beam cross-linkage. The copolymers may contain acidic polar groups and basic polar groups like —COOH, —$SO_3M$, —$OSO_3$ M, —$OPO_3X$, —$PO_3X$, —$PO_2X$, —$N^+R_3Cl^-$, and —$NR_2$ as polar groups at a terminal or in a side chain. The incorporation of these additional polar groups has the advantage of improving the dispersibility.

These polar groups may be used either single or the form of a combination of two or more members.

Various polyisocyanates can be used as a hardening agent for hardening a binder resin. A hardening agent obtained by converting at least one member selected from the group consisting of tolylene diisocyanate, hexamethylene diisocyanate, and methylene diisocyanate into trimethylol propane which possesses a plurality of hydroxyl groups or into an isocyanurate type hardening agent having three molecules of diisocyanate compound bound therein is advantageously used. The content of the hardening agent is appropriately in the range of 1 to 50% by weight, based on 100% by weight of the resin. This hardening agent is three-dimensionally bound with the hydroxyl group contained in the binder resin to improve the durability of the coating layer.

The concrete commercially available products include Coronate L, HL, and 3041 marketed by Nippon Polyurethane K.K. 24A-100 and TPI-100 marketed by Asahi Chemical Industry Co., Ltd. and Desmodule L and N marketed by BF Goodrich Corp., for example.

Generally, the reactive or thermosetting resin is hardened by heating the resin in an oven at a temperature in the range of 50° to 80° C. for a period in the range of 6 to 100 hours or by passing the resin at a low speed through the interior of an oven at a temperature in the range of 80° to 120° C.

The copolymer may be modified, prior to use, by the well-known method so as to incorporate therein a (meth)acrylic type double bond and acquire sensitivity to the electron beam. As means to effect the modification for the impartation of electron beam sensitivity, the method of urethane modification which comprises causing the copolymer to react with an adduct of tolylene diisocyanate (TDI)

with 2-hydroxyethyl (meth)acrylate (2-HEMA), the improved method of urethane modification which involves use of a monomer (such as, for example, 2-isocyanate ethyl(meth)acrylate) which contains at least one ethylenically unsaturated double bond and one isocyanate group in the molecule and containing no urethane bond in the molecule, and the method of ester modification which comprises causing a resin possessing a hydroxyl group or a carboxylic acid group to react with a compound possessing a (meth)acryl group and a carboxylic anhydride or a dicarboxylic acid have been well known in the art. Among other methods, the improved method of urethane modification has the particular advantage of allowing an addition to the content of the vinyl chloride type resin without developing brittleness and permitting production of a coating excelling in dispersing property and surface properties. The content of the electron beam functional group is appropriately in the range of 1 to 40 mol %, preferably 10 to 30 mol %, in the hydroxyl group component from the standpoint of the stability in the process of production and the electron beam curing property. Particularly in the case of a vinyl chloride type copolymer, when the relevant monomers are so used in the reaction as to effect incorporation in the produced copolymer of 1 to 20, preferably 2 to 10, functional groups per molecule, the electron beam-cured resin consequently obtained excels in both dispersing property and hardening property.

The term "acryl type double bond" as used herein refers to a (meth)acryloyl group which is the residue of (meth)acrylic acid, (meth)acrylic esters, and (meth)acrylic acid amides. The electron beam sensitive resin, prior to use, is allowed to incorporate therein 1 to 50% by weight of the well-known polyfunctional acrylate for the purpose of improving the ratio of cross-linkage.

As the source of radiation for the curing of the coating material using the electron beam sensitive modified resin as a binder, an electron beam and/or an ultraviolet light is used advantageously from the viewpoint of facilitating the control of the amount of radiation absorbed, the introduction of the radiation into the line of production process, and the shielding of an operation in process against an ionizing radiation. In the case of the electron beam, it is advantageous to adopt an electron beam accelerator having an acceleration voltage in the range of 100 to 750 KV, preferably 150 to 300 KV and operate this electron beam accelerator so that the amount of radiation to be absorbed is in the range of about 20 to 200 k-gray.

In the case of the electron beam cross-linkage, it is important that the electron beam be irradiated in an ambience of such an inert gas as $N_2$, He, or $CO_2$ having an oxygen content of 1% and less. This condition is intended to prevent the $O_3$ produced in consequence of the irradiation from sequestering a radical.

When the ultraviolet light is used, the binder containing the electron beam curing resin incorporates therein a well-known photopolymerization sensitizer. It can be effectively irradiated by the use of such an ultraviolet light tube as a xenon discharge tube or a hydrogen discharge tube.

The solvent to be contained in the magnetic coating material has no particular limit. It is properly selected in due respect of such factors as the solubility and compatibility of the binder resin, and drying efficiency of the binder. As concrete examples of the solvent, ketones such as methylethyl ketone, methylisobutyl ketone, and cyclohexanone, aromatic hydrocarbons such as toluene and xylene, esters such as ethyl acetate and butyl acetate, alcohols such as isopropanol and butanol, chlorine-substituted hydrocarbons, dioxane, tetrahydrofuran, dimethyl formamide, and hexane, and other similar diluents and solvents may be cited. These solvents can be used either singly or in the form of a mixture of two or more members.

The organic solvent is not always required to have an assay of 100%. It may contain such impurities as isomers, unaltered reactants, by-products, decomposed substances, oxides, and moisture. The total content of these impurities must be 5% and less, preferably 3% and less, by weight. If the content of impurities is unduly large, the excess impurities will exert adverse effects on the dispersibility of the magnetic powder, the storageability of the coating material, the hardening properties of the magnetic layer, and the storage properties of the medium.

The solvent is appropriately used in an amount in the range of 10 to 10000%, preferably 100 to 5000%, by weight based on the total amount of the binder so that the viscosity of the produced coating material determined at the stage of application to a substrate by the use of a corn plate type or a double-cylinder type viscosimeter at a shear rate of 3000 $sec^{-1}$ falls in the range of 5 to 100 cps. The ratio of the amount of the solvent to the whole amount of the coating material is appropriately in the approximate range of 5 to 40%, preferably 10 to 35%, by weight as solids (nonvolatile substances) concentration. The kind, the mixing ratio, and the amount of this solvent to be used ought to be determined in due consideration of the kind, specific surface area, particle size, amount of magnetization, volume or weight degree of filling of the pigment used in the coating material, and the dilution stability of the coating material so that the viscosity of the coating material falls in the range mentioned above.

The addition of the solvent is advantageously carried out stepwise along the component steps of the process of production of the coating material. Otherwise, it may be sequentially added as stirred at a fixed flow volume into the tank or it may be gradually mixed with the coating material in the pipe leading to the site of application to a substrate. When the solvent is added to the coating material or when the coating material is diluted with the solvent, the coating material is appropriately subjected to a treatment of filtration and/or dispersion when permissible. This treatment is effective in stabilizing the coating material and repressing the occurrence of agglomeration and foreign matter.

The magnetic coating material generally contains a lubricant. In the various known lubricants, a fatty acid and/or a fatty ester is used particularly advantageously. As concrete examples of the fatty acid, monobasic fatty acids of 12 to 24 carbon atoms (which may contain an unsaturated bond or a branch) may be cited. As concrete examples of the fatty ester, monofatty esters, difatty esters, and trifatty esters formed to react monobasic fatty acids of 10 to 24 carbon atoms (which may contain an unsaturated bond or a branch) with one of alcohols such as cyclic or polysaccharide reduced alcohols (such as sorbitans and sorbitols), monovalent, divalent, trivalent, tetravalent, pentavalent, and hexavalent alcohols having 2 to 22 carbon atoms (which may contain an unsaturated bond or a branch) may be cited. These lubricants may be used either singly or in the form of a mixture of two or more members.

As concrete examples of the monobasic fatty acid, lauric acid, myristic acid, stearic acid, oleic acid, linolic acid, linolenic acid, behenic acid, erucic acid, and elaidic acid may be cited. As concrete examples of the fatty ester, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate may be cited.

The effect of such a fatty acid and/or a fatty ester as a lubricant or dispersant is manifested by having the acid and/or ester incorporated in the magnetic coating material in a total amount of 0.1% and over by weight based on the amount of the fine ferromagnetic powder. The conspicuity of this effect grows in proportion as the total content of this acid and/or ester increases. If this total content is more than 20% by weight based on the amount of the fine ferromagnetic powder, the excess lubricant or dispersant will not remain fast within the magnetic layer but exude to the surface of the magnetic layer possibly to the extent of exerting adverse effects of smearing the magnetic head and lowering the output of the recording medium.

The total content of the fatty acid and/or fatty ester in the magnetic layer, therefore, is appropriately in the range of 0.1 to 20%, preferably 1 to 15%, by weight based on the amount of the fine ferromagnetic powder.

The lubricant is advantageously contained in the backcoat layer, the undercoating layer, etc. in addition to the magnetic layer. Particularly when the magnetic layer is thin, the incorporation of the lubricant in the undercoating layer is effective in enhancing the still durability of this layer.

Further, when the magnetic recording medium has a backcoat layer, the lubricant may be incorporated more in the backcoat layer side of the recording medium with the hope of enhancing the lubricity of the surface of the magnetic layer owing to the transfer of the lubricant from the backcoat layer to the magnetic layer.

The fatty acid and/or the fatty ester need not always have an assay of 100% but may contain such impurities as isomers, unaltered reactants, by-products, decomposed substances, and oxides. The total content of these impurities is appropriately 40% and less, preferably 20% and less.

The additives including the fatty acid and the fatty ester to be used herein may be wholly or partly added to the coating material in process at any of the component steps of the process for the manufacture of the magnetic recording medium. This addition is implemented, for example, by the additives being mixed with the pigment powder prior to the step of kneading, added during the step of kneading of the pigment powder and the binder with the aid of a solvent, added at the step of dispersion, added subsequent to the step of dispersion, added immediately before the step of application to a substrate, or a solution on dispersion of additives coated on a magnetic layer formed in advance.

The magnetic coating material generally incorporates therein additives capable of manifesting a lubricating effect, an antioxidant effect, a dispersing effect, a plasticizing effect, etc. As concrete examples of the additives, silicone oils, fluorine oil, fluorine-substituted hydrocarbon-containing alcohols, fatty acids, esters, and ethers, paraffins, metal (Li, Na, K, Ca, Ba, Cu, Pb, etc.) salts of such monobasic fatty acids as mentioned above, alcohols for the production of such fatty esters as mentioned above, alkoxy alcohols, fatty esters of polyethylene oxide-added monoalkyl ethers, aliphatic or cyclic amines, fatty acid amides, quaternary ammonium salts, polyolefins, polyglycols, polyphenyl ethers, fluorine-containing alkyl sulfuric esters and alkali metal salts thereof, alkylene oxide type, glycerin type, glycidol type, and alkylphenol ethylene oxide-added type nonionic surfactants, cationic surfactants such as phosphonium and sulfonium and alkali metal salts thereof, anionic surfactants containing such acidic groups as carboxylic acid group, sulfonic acid group, phosphoric acid group, sulfuric ester group, and phosphoric ester group and alkali metal salts thereof, and amphoteric surfactants such as amino acids, aminosulfonic acids, sulfuric or phosphoric esters of amino alcohols, and alkyl betaines may be cited.

These surfactants are described in detail in the "Surfactant Handbook" (published by Sangyo Tosho K.K.).

The amount of such a surfactant to be incorporated in the magnetic coating material is appropriately 10% and less, preferably in the range of 0.01 to 5%, by weight based on the amount of the magnetic powder. In the absence of the magnetic powder, this amount is properly in the range of 0.005 to 50% by weight based on the amount of the binder.

The magnetic coating material may further incorporate therein an inorganic compound. As concrete examples of the inorganic powder to be used for this purpose, metals, metal oxides, metal carbonates, metal sulfates, metal nitrides, metal carbides, and metal sulfides each in the form of a powder may be cited.

More specifically, such inorganic compounds include $\alpha$-alumina, $\beta$-alumina, $\gamma$-alumina, $\theta$-alumina, $\delta$-alumina, dichromium trioxide, $\alpha$-iron oxide, $\gamma$-iron oxide, goethite, $SiO_2$, $ZnO$, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, and man-made diamond, for example. These inorganic compounds can be used either singly or in the form of a mixture of two or more members.

The inorganic compound is appropriately used in an amount in the range of 0.1 to 20% by weight based on the amount of the magnetic powder.

The inorganic compounds enumerated above may be used as properly combined to suit the properties expected of the magnetic layer.

The shape, size, etc. of the particles of the inorganic powder may be arbitrarily set. The particles are appropriately in the shape of globules, granules, or minute polyhedrons. The particle side of the inorganic powder is favorably in the range of 0.01 to 0.7 μm. These attributes may be properly selected, when necessary, to suit the balanced magnitudes of the durability of the medium, the wear of the recording head, and the output at the shortest recording wavelength. The inorganic compounds cited above may be used either singly or in the form of a combination of two or more members. The particle size distribution and other similar factors may be selected independently for the inorganic compounds to be selected.

The inorganic compound is not always required to have an assay of 100%. The effect of the inorganic compound is not lowered at all so long as the inorganic compound has an assay of 70% and over.

It is further necessary that the inorganic compound contain water-soluble ions of alkali metals, alkaline earth metals, chlorine, sulfuric acid, and nitric acid only in a minute amount. If these ions are contained therein in an unduly large amount, the large amount of ions will exert adverse effects on the storage properties of the produced magnetic recording medium.

The inorganic compound may be added at the time that it is kneaded with or dispersed in the magnetic powder. Otherwise, it may be dispersed in advance in the binder and then added at the time that it is dispersed in the magnetic coating material.

The magnetic coating material may further incorporate therein carbon black. As concrete examples of the carbon black to be used herein, furnace carbon black, thermal carbon black, and acetylene black may be cited. The particle size and other similar factors of the carbon black may be arbitrarily set. To be specific, they may be properly selected to consider the balance of magnitudes of the electric resistance, friction properties, and the output at the shortest recording wavelength (surface roughness). The species of carbon black mentioned above may be used either singly or in the form of a mixture of two or more members. The aforementioned factors may be selected independently for the species of carbon black to be selected. The average particle diameter of the carbon black is properly in the range of 10 to 400 nm, preferably 20 to 350 nm. More specifically, in the range of 20 to 40 nm when the electromagnetic transducer properties are taken into account preferentially. In case of considering the friction, the largest possible particle diameter allowable for the sake of the electromagnetic transducer properties may be selected in the range of 40 to 350 nm. In the selection of carbon black, not only the particle size but also the BET value and the DBP value (dibutyl phtharate adsorption value) must be taken into account. Since the particle size, BET value, and DBP value of carbon black are so closely related to one another as to render it infeasible to set these factors at independent and mutually remote magnitudes, the three factors must be empirically selected based on the properties expected of the recording medium and the dispersion properties and the flow properties of the coating material.

The carbon black is used in an amount in the range of 10 to 500% by weight based on the amount of the binder or in the range of 0.1 to 20% by weight based on the amount of the magnetic powder. These gravimetric ratios of the amount of carbon black must be empirically selected based on the properties expected of the recording medium and the dispersion properties and flow properties of the coating material. The species of carbon black are used as properly combined to suit the properties expected of the magnetic layer, the backcoat layer, and the undercoating layer. The carbon black may be added at the time that it is kneaded with or dispersed in the magnetic powder. Otherwise, it may be dispersed in advance in the binder and then added at the time that it is dispersed in the magnetic coating material.

The carbon black may be subjected to a surface treatment using a lubricant or a dispersant. Otherwise, it may have part of the surface of its particles graphitized prior to use. For information on the carbon black which can be used in this invention, the "Carbon Black Nenkan" compiled by Carbon Black Society can be consulted.

The magnetic coating material may further incorporate therein a non-ferromagnetic organic powder. As concrete examples of the non-ferromagnetic organic powder to be used herein, acryl-styrene type resin powder, benzoguanamine resin powder, melamine type resin powder, phthalocyanine type pigment, azo type pigment, polyolefin type resin powder, polyester type resin powder, polyamide type resin powder, polyimide type resin powder, hydrocarbon fluoride resin powder, and divinyl benzene type resin powder may be cited. This non-ferromagnetic organic powder is used in an amount in the range of 0.1 to 20% by weight, based on the amount of the binder.

The substrate on which the magnetic coating material is deposited by coating may be any of the well-known films such as, for example, polyesters like polyethylene terephthalate (PET) and polyethylene naphthalate (PEN), polyolefins, polyamides, polyimides, polyamideimides, polysulfone, cellulose triacetate, and polycarbonates. Among other well-known films mentioned above, PET, PEN, and aromatic polyamides prove particularly proper. A composite film obtained by multi-layer coextrusion of two or three PET or PEN compounds or the aromatic polyamides are more advantageous. The use of this film allows easy acquisition of the electromagnetic transducer properties, durability, wear properties, film strength, and productivity in ideally balanced magnitudes.

The substrate of the nature described above appropriately incorporates therein as a filler such an inorganic compound as oxides or carbonates of Al, Ca, Si, and Ti or such an organic compound as acryl resin type fine powder. By the amount and the size of this filler, the surface property of the substrate can be freely controlled and the electromagnetic transducer properties, durability, and wear properties can be controlled as well.

Further, the substrate can be pretreated by corona discharge, plasma discharge, and/or polymerization, pretreated for facilitating application of an adhesive agent or effecting removal of dust, or pretreated with heat and/or controlled moisture for alleviation of stress, for example.

The substrate to be used must properly possess surface roughness of center-line average (Ra) of 0.03 μm and less, preferably 0.02 μm and less, and more preferably 0.01 μm and less. To be ideal, this substrate not only possesses such small surface roughness of center-line average as mentioned above but also avoids possessing coarse projections of 0.5 μm and more.

The so-called F-5 values of the substrate in the direction of tape travel and the direction of tape width are properly each in the range of 5 to 50 kg/mm$^2$. Although the F-5 value in the direction of tape length is generally larger than that in the direction of tape width, there are times when the strength in the direction of width must be higher as in the case of tape for Digital Video Tape recorder (DVT). The ratio of thermal shrinkage of the substrate in the direction of tape travel and the direction of tape width at 100° C. for 30 minutes is appropriately 3% and less, preferably 1.5% and less and at 80° C. for 30 minutes 1% and less, preferably 0.5% and less.

The strength at fracture of the substrate is properly in the range of 5 to 100 kg/mm$^2$ and the modulus of elasticity thereof in the range of 100 to 2000 kg/mm$^2$ in both the directions mentioned above.

For the coating of the magnetic coating material on the substrate, a method of extrusion nozzle coating, a method of reverse roll coating, a method of gravure roll coating, a method of doctor blade coating, a method of kiss coating, a method of collar coating, and a method of slide bead coating can be utilized. Among other methods mentioned above, the method of gravure roll coating excels in productivity and the method of reverse roll coating has the advantage of being adoptable for a wide range of coating materials. The method of extrusion nozzle coating is at an advantage in allowing simultaneous multilayer coating. In these three particularly favorable methods, the method of extrusion nozzle coating stands out in point of controlling the thickness of an applied layer easily.

The magnetic coating material which has been coated on the substrate by such a method as described above (to form a so-called magnetic layer), when necessary, may be subjected to a treatment for the orientation of a magnetic field, a drying treatment, or a surface smoothing treatment. Then, the obtained material is cut into strips of a prescribed shape, for example, to give rise to magnetic recording media. In the formation of the magnetic layer, the practice of conferring on this magnetic layer a laminated construction of two layers, i.e. one upper and one lower layer, is in vogue. In this case, (1) the ultrasonic treatment contemplated by this invention can be performed only on the magnetic coating material forming the upper layer, (2) the ultrasonic treatment contemplated by this invention can be applied to both the magnetic coating materials forming the upper and the lower layer, or (3) the ultrasonic treatment contemplated by this invention can be carried out only on the magnetic coating material forming the lower layer.

Also when an undercoating layer containing carbon black or an inorganic type or organic type non-ferromagnetic powder possessing as minute a particle diameter as carbon black and exhibiting inferior paint stability (hereinafter referred to collectively as "non-magnetic powder") is formed beneath the magnetic layer, the procedure which comprises preparatorily subjecting the coating material for tire undercoating layer to the ultrasonic treatment contemplated by this invention is a measure effective in improving the stability of the coating material.

The furnace carbon black, the thermal carbon black, the acetylene black, etc. mentioned above are usable for the carbon black to be contained in the undercoating layer.

For the inorganic type non-ferromagnetic powder to be contained in the undercoating layer, the inorganic powders cited above can be used either singly or in the form of a mixture of two or more members.

The particles of the inorganic non-ferromagnetic powder appropriately have an average size generally in the range of 0.01 to 0.7 μm when they are in the shape of granules, globules, or minute polyhedrons. When the particles are in the shape of needles, the length of major diameter is in the range of 0.05 to 1.0 μm, preferably 0.05 to 0.5 μm and the acicular ratio in the range of 5 to 20, preferably 5 to 15. When the particles are in the shape of plates, the plate diameter is in the range of 0.05 to 1.0 μm, preferably 0.05 to 0.5 μm and the plate like ratio (the ratio of plate diameter to thickness) in the range of 5 to 20, preferably 10 to 20. The inorganic non-ferromagnetic powder of the nature described above is not always required to have an assay of 100%. It may have the surface thereof, when necessary, treated with various compounds of Al, Si, Ti, Zr, Sn, Sb, Zn, and the like so as to have the oxides thereof formed on the surface. Optionally, the surface treatment may be effected with an organic compound such as polyethylene glycol.

The organic non-ferromagnetic powder may be properly selected from among the organic compounds cited above.

The binder to be used in the undercoating layer may be properly selected from among the binders cited above.

Now, this invention will be described more specifically below with reference to working examples of the invention to be cited herein below.

EXAMPLE 1

A ferromagnetic coating material for the formation of a magnetic layer was prepared with the following composition including a magnetic powder of ferromagnetic metal [Fe/Co/Al/Y=100/20/4.2/5.3 (gravimetric ratio)] having Hc=2000 Oe, $\sigma_s$=140 emu/g, an average length of major axis 0.08 μm, and an average ratio of axes 5.

Composition of magnetic coating material for formation of magnetic layer

| | |
|---|---|
| Magnetic powder of ferromagnetic material | 100 parts by weight |
| Vinyl chloride type copolymer (produced by Nippon Zeon K. K. and marketed under product code of "MR-110") | 8.3 parts by weight |
| Polyester polyurethane resin (produced by Toyo Boseki Co., Ltd. and marketed under product code of "UR-8300") | 8.3 parts by weight |
| α-Alumina (produced by Sumitomo Chemical Co., Ltd. and marketed under product code of "HIT60A") | 8 parts by weight |
| Stearic acid | 1 part by weight |
| Butyl stearate | 1 part by weight |
| Methylethyl ketone | 111 parts by weight |
| Toluene | 111 parts by weight |
| Cyclohexanone | 74 parts by weight |

Part or the whole of this composition was given a thorough kneading treatment in a kneader and dispersed, mixed, and diluted by means of a sand grinder mill. The magnetic coating material thus obtained and 3.3 parts by weight of a hardening agent (produced by Nippon Polyurethane Kogyo K.K. and marketed under trademark designation of "Coronate L") added thereto were mixed and the resultant mixture was given an ultrasonic treatment under the conditions shown in Table 1. Within 30 minutes following the completion of the ultrasonic treatment, the magnetic coating material was coated so much by the method of extrusion nozzle coating using an extrusion nozzle on a PET substrate 8 μm as to produce, a magnetic layer 1.5 μm in thickness (drying). Then, the magnetic layer was given an orienting treatment, dried, and subjected to a calendering treatment.

Meanwhile, the following backcoat composition was applied to the other side of the PET substrate (the surface not covered by the magnetic layer) and the resultant backcoat layer was subjected to a calendering treatment and a thermosetting treatment. Thereafter, the resultant material was cut into strips 8 mm in width to produce tapes of magnetic recording medium.

Composition for formation of backcoat layer

| | |
|---|---|
| Carbon black-1 having an average particle diameter of 21 nm and a BET value of 220 m$^2$/g (produced by Columbian Carbon K. K. and marketed under trademark designation of "Conductex SC Ultra") | 80 parts by weight |
| Carbon black-2 having an average particle diameter of 350 nm and a BET value of 8 m$^2$/g (produced by Columbian Carbon K. K. and marketed under trademark designation of "Sevcarb MT") | 1 part by weight |
| α-Iron oxide having an average particle diameter of 0.1 μm (produced by Toda Kogyo K. K. and marketed under product code of "100ED") | 1 part by weight |
| Vinyl chloride-vinyl acetate-vinyl alcohol copolymer having an average polymerization degree of 420 (produced by Nisshin Kagaku Kogyo K. K. and marketed under product code of "MPR-TA") | 40 parts by weight |
| Vinyl chloride-vinyl acetate-vinyl alcohol copolymer containing 390 ppm of nitrogen atoms and having an average polymerization degree of 340 (produced by Nisshin Kagaku Kogyo K. K. and marketed under product code of "MRR-ANO (L)") | 25 parts by weight |
| Polyester polyurethane resin containing —SO$_3$Na and having a number average molecular weight of 40000 (produced by Toyo Boseki Co., Ltd. and marketed underproduct code of "TS9555") | 35 parts by weight |
| Methylethyl ketone | 700 parts by weight |
| Toluene | 400 parts by weight |
| Cyclohexanone | 300 parts by weight |

An ultrasonic treating device used in the ultrasonic treatment of the magnetic coating material was constructed as shown in FIG. 1, with the operating area, i.e. an operating end face of an ultrasonic horn for exerting an ultrasonic oscillation on the magnetic coating material fixed at 10.18 cm² and the operating depth H varied in the range of 1 to 48 mm. One or three such devices were disposed in series connection as shown in FIG. 3 and the flow volume of the magnetic coating material was so adjusted as to obtain a stated time of ultrasonic irradiation. Where the operating depth, H, was 3 mm and the time of ultrasonic irradiation, t, was 0.5 second, for example, one ultrasonic treating device was used and the ultrasonic treatment was performed at a flow volume (of the magnetic coating material) of 22 liters/hour. The ultrasonic wave was irradiated under the conditions of 20 kHz of frequency of oscillation, 25 µm of amplitude, and 1.5 kgf/cm² of pressure (gauge pressure).

Samples were prepared by varying the time of ultrasonic irradiation as shown in Table 1. They were tested for magnetic property, electromagnetic transducer property, and tape surface property as shown below.

Surface roughness of center-line average, Ra

This property was tested by the use of a surface roughness testing device (produced by Rank-Taylor-Hobson Corp and marketed under trademark designation of "Talystep") at 50,000 magnifications and a measuring wavelength, λ, of 3.3 to 167 µm in accordance with JIS (Japanese Industrial Standard) B 0601 (1982). The sample length was 0.5 mm (the number of values n=5) and the unit was reduced to nm.

Squareness ratio, ΔSQ

The squareness ratio, Br/Bm, was determined by measuring the magnetism of a sample by means of an instrument (produced by Toei Kogyo K. K. and marketed under product code of "Vibrating Sample Magnetometer(VSM)") under application of a magnetic field of 795.8 kA/m (10 KOe). The results obtained of various samples were relatively rated with a sample (control) having 0 for the time, t, of ultrasonic irradiation as the standard. The symbol Δ stands for an increment.

Electromagnetic transducer property

This property was determined by measuring the play-back output of a recording signal of a wavelength of 7.6 MHz by means of a Hi-8 deck (produced by Sony Corporation and marketed under product code of "EV-S900"). The results obtained of various samples were relatively rated with a sample (control) having 0 for the time, t, of ultrasonic irradiation as the standard.

Overwrite property, O/W

This property was determined by first recording with a recording wavelength of 1.0 µm, and overwrite with a recording wavelength of 0.5 µm at the same recording position by means of a Hi-8 deck (produced by Sony Corporation and marketed under product code of "EV-S900"), measuring the play-back output of the component of recording wavelength of 1.0 µm at the position of overwriting, and representing the ratio of erasure of the recording wavelength of 1.0 µm by the unit of dB. The magnitude of optimum recording current at the recording wavelength of 0.5 µm was used as the recording current.

Degree of increase friction durability

This property was determined by preparing a sample wound at an angle of 90° round a pin of SUS 304 having a diameter of 2.0 mm and a roughness of 0.2S (finished with a surface roughness. Rmax–0.2 µm) and rubbing the sample over a distance of 50 mm 100 times under a load of 30 g at a speed of 18.8 mm/s. The difference between the friction coefficient during the 100th pass and that during the first pass was reported as the degree of rise of friction durability.

Durability in motion at 40° C. and 80% RH

A T-60 sample (60 minutes tape sample) was subjected to record over the total length, and to replayed over the total length of 49 passes by means of a Hi8 deck (produced by Sony Corporation and marketed under product code of "EVS55") in an ambience kept at 40° C. and 80% RH. The outputs obtained then were recorded on a chart and the sample was visually examined to determine changes in output and the condition of recording head clogging. The results were rated on the following scale.

○ . . . No clogging and no decline of output

Δ . . . A decline of output found at not more than fivepoints within 60 seconds and −3 dB and norepeatability observed x . . . Clogging observed The results are shown in Table 1 below.

TABLE 1

| Sample No. | H (mm) | t (sec) | Formula (1) | Ra (nm) | ΔSQ | Output at 7.6 MHz (dB) | O/W (dB) | Increase of friction | Durability | Overall rating |
|---|---|---|---|---|---|---|---|---|---|---|
| 1-1 | — | 0 | — | 6.0 | 0.00 | 0.0 | 26 | +0.01 | ○ | X1 |
| 1-2 | 1 | 0.1 | X | 5.0 | +0.02 | +0.3 | 25 | +0.03 | ○ | X1 |
| 1-3 | 1 | 0.3 | ○ | 4.1 | +0.08 | +1.0 | 22 | +0.07 | ○ | X2 |
| 1-4 | 1 | 2.0 | ○ | 3.7 | +0.09 | +1.4 | 22 | +0.09 | Δ | X2 |
| 1-5 | 1 | 3.0 | ○ | 3.8 | +0.09 | +1.3 | 20 | +0.12 | X | X2 |
| 1-6 | 2 | 0.1 | X | 5.5 | +0.01 | +0.2 | 26 | 0.00 | ○ | X1 |
| 1-7 | 2 | 0.4 | ○ | 4.5 | +0.07 | +0.9 | 25 | +0.01 | ○ | ⊙ |
| 1-8 | 2 | 4.0 | ○ | 3.9 | +0.10 | +1.6 | 25 | +0.03 | ○ | ⊙ |
| 1-9 | 2 | 6.0 | ○ | 3.6 | +0.10 | +1.6 | 20 | +0.04 | ○ | ○ |
| 1-10 | 3 | 0.2 | X | 5.5 | +0.02 | +0.2 | 25 | 0.00 | ○ | X1 |
| 1-11 | 3 | 0.5 | ○ | 4.5 | +0.07 | +1.2 | 25 | 0.00 | ○ | ⊙ |
| 1-12 | 3 | 3.0 | ○ | 4.2 | +0.10 | +1.5 | 25 | +0.02 | ○ | ⊙ |
| 1-13 | 3 | 6.0 | ○ | 3.8 | +0.09 | +1.9 | 24 | +0.03 | ○ | ⊙ |
| 1-14 | 3 | 9.0 | ○ | 3.8 | +0.10 | +1.9 | 22 | +0.04 | ○ | ○ |
| 1-15 | 3 | 10.0 | X | 3.7 | +0.10 | +1.7 | 20 | +0.08 | Δ | X2 |
| 1-16 | 3 | 12.0 | X | 3.9 | +0.10 | +1.7 | 20 | +0.12 | X | X2 |
| 1-17 | 8 | 0.5 | X | 5.3 | +0.02 | +0.1 | 25 | +0.01 | ○ | X1 |
| 1-18 | 8 | 1.5 | ○ | 4.4 | +0.08 | +1.1 | 25 | +0.01 | ○ | ⊙ |
| 1-19 | 8 | 16.0 | ○ | 3.9 | +0.10 | +1.6 | 24 | +0.03 | ○ | ⊙ |
| 1-20 | 8 | 24.0 | ○ | 3.7 | +0.10 | +1.5 | 22 | +0.03 | ○ | ⊙ |
| 1-21 | 8 | 30.0 | X | 3.7 | +0.10 | +1.4 | 21 | +0.07 | Δ | X2 |
| 1-22 | 18 | 1.0 | X | 5.2 | +0.03 | +0.2 | 26 | +0.01 | ○ | X1 |
| 1-23 | 18 | 3.0 | ○ | 4.4 | +0.07 | +1.0 | 25 | +0.02 | ○ | ⊙ |
| 1-24 | 18 | 30.0 | ○ | 3.8 | +0.10 | +1.5 | 25 | +0.03 | ○ | ⊙ |

TABLE 1-continued

| Sample No. | H (mm) | t (sec) | Formula (1) | Ra (nm) | ΔSQ | Output at 7.6 MHz (dB) | O/W (dB) | Increase of friction | Durability | Overall rating |
|---|---|---|---|---|---|---|---|---|---|---|
| 1-25 | 18 | 50.0 | O | 3.9 | +0.10 | +1.5 | 22 | +0.03 | O | ⊙ |
| 1-26 | 18 | 70.0 | X | 3.7 | +0.09 | +1.2 | 22 | +0.08 | Δ | X2 |
| 1-27 | 28 | 3.0 | X | 5.3 | +0.02 | +0.2 | 25 | 0.00 | O | X1 |
| 1-28 | 28 | 5.0 | O | 4.5 | +0.08 | +0.8 | 25 | +0.01 | O | ⊙ |
| 1-29 | 28 | 30.0 | O | 4.4 | +0.10 | +1.3 | 25 | +0.03 | O | ⊙ |
| 1-30 | 28 | 55.0 | O | 3.9 | +0.10 | +1.4 | 24 | +0.04 | O | ⊙ |
| 1-31 | 28 | 80.0 | O | 3.8 | +0.10 | +1.3 | 22 | 0.00 | O | O |
| 1-32 | 28 | 100.0 | X | 3.8 | +0.10 | +1.1 | 21 | +0.07 | Δ | X2 |
| 1-33 | 38 | 4 | X | 5.4 | +0.02 | +0.2 | 26 | 0.00 | O | X1 |
| 1-34 | 38 | 8 | O | 4.5 | +0.07 | +0.6 | 25 | +0.02 | O | ⊙ |
| 1-35 | 38 | 60 | O | 4.2 | +0.08 | +0.9 | 25 | +0.02 | O | ⊙ |
| 1-36 | 38 | 100 | O | 3.9 | +0.10 | +1.1 | 24 | +0.03 | O | ⊙ |
| 1-37 | 38 | 120 | X | 3.8 | +0.09 | +1.0 | 22 | +0.08 | Δ | X2 |
| 1-38 | 38 | 150 | X | 3.9 | +0.08 | +1.1 | 21 | +0.10 | X | X2 |
| 1-39 | 48 | 6 | X | 5.6–6.0 | +0.01 | 0.0 | 26 | 0.00 | O | X3 |
| 1-40 | 48 | 8 | O | 5.0–5.4 | +0.01–+0.05 | +0.5–+0.0 | 25–26 | +0.01 | O | X3 |
| 1-41 | 48 | 90 | O | 4.8–5.0 | +0.04–+0.06 | +0.5–+0.2 | 25–26 | +0.03 | O | X3 |
| 1-42 | 48 | 120 | O | 4.2–4.5 | +0.06–+0.07 | +0.6–+0.2 | 24–26 | +0.06 | O | X3 |
| 1-43 | 48 | 150 | X | 4.1–4.3 | +0.08–+0.09 | +0.8–+0.6 | 24–25 | +0.08 | Δ | X3 |

‡In Table 1, the mark "O" stand for satisfaction of the condition of Formula (1) and the mark "X" for unsatisfaction of the condition of Formula (1)
‡The scale of overall rating in Table 1:
⊙ ... Excellent in all the properties
O ... Excellent in all the properties in the format having no bearing on O/W property
X1 ... Practically unsafe because of deficiency in electromagnetic transducer properties
X2 ... Practically unsafe because of deficiency in properties of motion and inferior O/W properties
X3 ... Practically unsafe because of dispention in data of properties It is noted from the results shown in Table 1 that the surface roughness of center-line average Ra, the squareness ratio ΔSO, and the output were markedly improved when the operating depth H was in the range of 2 to 40 mm and the time of ultrasonic irradiation t was in the range represented by the formula (1). Such unfavorable results as rise of friction resistance and decline of durability were observed when the time of ultrasonic irradiation t exceeded the upper limit of the range of the formula (1). In the case of the recording form requiring an overwrite property O/W, the time of ultrasonic irradiation was proper within 2H.

EXAMPLE 2

Figure 4:
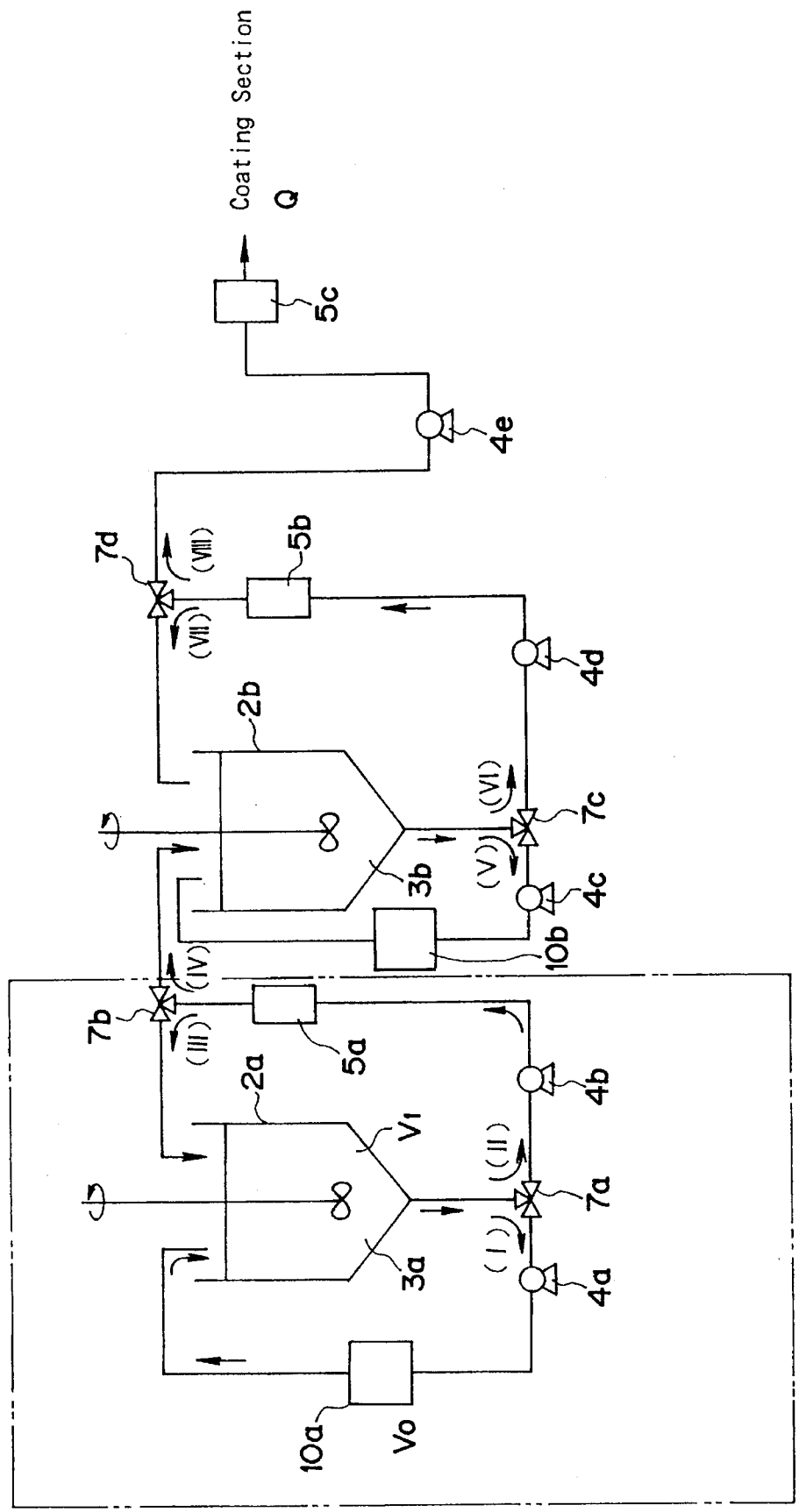
FIG. 4 is a schematic process diagram showing an ultrasonic wave treatment which is effected by means of circulating the material under treatment through the treating device.

Various samples were prepared and tested by following the procedure of Example 1 while using the same magnetic coating material and subjecting them to ultrasonic irradiation by a method of circulation as shown in FIG. 4 in the place of the method of passage. During the ultrasonic irradiation, the magnetic coating material was used for circulation in an amount of 20 liters, with the flow volume fixed at 3 liters/min. The specifications of the ultrasonic irradiation device used herein were equal to those of the device used in Example 1, excepting the operating depth H was fixed at 3 mm.

The results are shown in Table 2 below.

TABLE 2

| Sample NO. | t (sec) | Ra (nm) | ΔSQ | Output at 7.6 MHz (dB) | O/W (dB) | Increase of friction | Durability | Formula (1) |
|---|---|---|---|---|---|---|---|---|
| 2-1 | 0 | 6.0 | 0 | 0 | 26 | 0 | O | — |
| 2-2 | 0.2 | 5.7 | +0.01 | +0.1 | 26 | 0 | O | X |
| 2-3 | 0.5 | 4.3 | +0.06 | +1.0 | 25 | 0 | O | O |
| 2-4 | 3.0 | 4.1 | +0.08 | +1.3 | 25 | 0.01 | O | O |
| 2-5 | 6.0 | 3.9 | +0.08 | +1.5 | 25 | 0.02 | O | O |
| 2-6 | 8.0 | 3.9 | +0.09 | +1.8 | 23 | 0.04 | O | O |
| 2-7 | 9.0 | 3.9 | +0.11 | +1.7 | 22 | 0.05 | O | O |
| 2-8 | 10.0 | 3.8 | +0.10 | +1.5 | 21 | 0.08 | O~Δ | X |
| 2-9 | 12.0 | 3.7 | +0.10 | +1.5 | 20 | 0.10 | X | X |

‡In Table 2 above, the mark "O" stands for satisfaction of the conditions of Formula (1) and the mark "X" for unsatisfaction of the conditions of Formula (1).

It is noted from the results shown in Table 2 that the ultrasonic irradiation, without reference to discrimination between the method of passage and the method of circulation, produced the same effects so long as the substantial time of ultrasonic irradiation spent on the magnetic coating materials was fixed.

EXAMPLE 3

A test was carried out to examine the waiting time, Tw, intervening between the time a given magnetic coating material was irradiated with the ultrasonic wave and the time the coating material was coated on a substrate.

Specifically, the magnetic coating material used in Example 1 was treated under the conditions shown in Table 3 shown below, applied to a substrate, and tested in the same manner as in Example 1. The ultrasonic treatment was carried out by the method of passage shown in FIG. 3. The waiting time, Tw, preceding the application of the coating material to the substrate, was adjusted by varying the available volumes of the supply line led to the coating section and the filter. For the sake of examining the effect of the timing for the mixing of the hardening agent, samples were prepared in the test runs using 30 minutes and 120 minutes for the waiting time, Tw, and effecting the incorporation of the hardening agent (produced by Nippon Polyurethane Kogyo K. K. and marketed under trademark designation of "Coronate L") before and after the ultrasonic irradiation. In the case of mixing the hardening agent after the irradiation, the magnetic coating material which had undergone the irradiation was introduced into a stirring tank, mixed therein with the hardening agent, then stirred, and supplied to the coating section so as to spend the stated waiting time, Tw.

The results are shown in Table 3 below.

TABLE 3

| Sample No. | H (mm) | t (sec) | Tw (min) | ΔSQ | Ra (nm) | Output 7.6 MHz (dB) | Formula (2) |
|---|---|---|---|---|---|---|---|
| 3-1 | 2 | 0.3 | 30 | +0.07 | 4.5 | +0.9 | O |
| 3-2 | 2 | 0.3 | 60 | +0.02 | 5.4 | +0.3 | X |
| 3-3 | 2 | 4.0 | 120 | +0.08 | 4.4 | +0.8 | O |
| 3-4 | 2 | 4.0 | 150 | +0.03 | 5.6 | +0.1 | X |
| 3-5 | 3 | 0.5 | 3 | +0.08 | 4.3 | +1.5 | O |
| 3-6 | 3 | 0.5 | 10 | +0.07 | 4.3 | +1.4 | O |
| 3-7 | 3 | 0.5 | 30 | +0.07 | 4.5 | +1.2 | O |
| 3-8 | 3 | 0.5 | 30* | +0.07 | 4.6 | +1.0 | O |
| 3-9 | 3 | 0.5 | 60 | +0.02 | 5.3 | +0.2 | X |
| 3-10 | 3 | 3.0 | 3 | +0.10 | 3.8 | +1.7 | O |
| 3-11 | 3 | 3.0 | 30 | +0.10 | 4.2 | +1.5 | O |
| 3-12 | 3 | 3.0 | 30* | +0.09 | 4.4 | +1.3 | O |
| 3-13 | 3 | 3.0 | 60 | +0.08 | 4.4 | +1.0 | O |
| 3-14 | 3 | 3.0 | 90 | +0.04 | 5.5 | +0.0 | X |
| 3-15 | 3 | 9.0 | 3 | +0.11 | 3.6 | +2.1 | O |
| 3-16 | 3 | 9.0 | 30 | +0.10 | 3.8 | +1.9 | O |
| 3-17 | 3 | 9.0 | 90 | +0.08 | 4.1 | +1.3 | O |
| 3-18 | 3 | 9.0 | 120 | +0.07 | 4.5 | +1.0 | O |
| 3-19 | 3 | 9.0 | 120* | +0.06 | 4.6 | +0.7 | O |
| 3-20 | 3 | 9.0 | 150 | +0.02 | 5.5 | +0.1 | X |
| 3-21 | 18 | 3.0 | 40 | +0.07 | 4.5 | +0.8 | O |
| 3-22 | 18 | 3.0 | 60 | +0.03 | 5.4 | +0.2 | X |
| 3-23 | 18 | 54.0 | 120 | +0.08 | 4.2 | +0.8 | O |
| 3-24 | 18 | 54.0 | 150 | +0.03 | 5.5 | +0.1 | X |
| 3-25 | 28 | 5.0 | 40 | +0.06 | 4.3 | +0.8 | O |
| 3-26 | 28 | 84.0 | 120 | +0.05 | 4.6 | +0.7 | O |
| 3-27 | 38 | 7.0 | 40 | +0.06 | 4.5 | +0.6 | O |
| 3-28 | 38 | 7.0 | 60 | +0.03 | 5.6 | +0.2 | X |
| 3-29 | 38 | 113.0 | 120 | +0.06 | 4.6 | +0.7 | O |
| 3-30 | 38 | 113.0 | 150 | +0.01 | 5.4 | +0.1 | X |

‡In Table 3 above, the mark "‡" represents a sample which had incorporated a hardening agent subsequently to the irradiation of ultrasonic wave.
‡In Table 3, the mark "O" stands for satisfaction of the conditions of Formula (2) and the mark "X" for unsatisfaction of the conditions of Formula (2).

It is noted from the results shown in Table 3 that no matter whether the incorporation of the hardening agent was made before or after the ultrasonic irradiation, the effects aimed at were obtained so long as the waiting time. Tw (minute), preceding the application of the coating material to the substrate, satisfied the following formula (2).

$$0 < Tw \leq 26.5 \, t/H + 44 \qquad \text{Formula (2)}$$

EXAMPLE 4

In the case of incorporating the hardening agent into the magnetic coating material before subjecting the magnetic coating material to the ultrasonic treatment, a test was carried out for the sake of examining the time, Tc, intervening between the time the hardening agent was incorporated and the time the magnetic coating material was subjected to the ultrasonic irradiation. To be specific, the same magnetic coating material as used in Example 1 and 3.3 parts by weight of a hardening agent (produced by Nippon Polyurethane Kogyo K. K. and marketed under trademark designation of "Coronate L") added thereto were stirred and mixed.

Than, various samples were prepared from the resultant mixture and tested by following the procedure of Example 1 while carrying out the ultrasonic irradiation under the conditions shown in Table 4 below. The operating depth, was fixed at 3 mm. The results are

TABLE 4

| Sample No. | t (sec) | Tw (min) | Tc (min) | SQ (Br/Bm) | Ra (nm) | Output at 7.6 MHz (dB) |
|---|---|---|---|---|---|---|
| 4-1 | 0.5 | 3 | 30 | 0.85 | 4.3 | +1.3 |
| 4-2 | 0.5 | 3 | 270 | 0.84 | 4.7 | +0.9 |
| 4-3 | 0.5 | 3 | 360 | 0.82 | 5.5 | +0.3 |
| 4-4 | 0.5 | 40 | 30 | 0.84 | 4.5 | +1.0 |
| 4-5 | 0.5 | 40 | 270 | 0.84 | 4.6 | +0.7 |
| 4-6 | 0.5 | 40 | 360 | 0.79 | 5.8 | +0.1 |
| 4-7 | 3.0 | 3 | 270 | 0.84 | 4.2 | +1.4 |
| 4-8 | 3.0 | 3 | 360 | 0.81 | 5.4 | +0.3 |
| 4-9 | 3.0 | 60 | 30 | 0.86 | 4.4 | +1.0 |
| 4-10 | 3.0 | 60 | 270 | 0.84 | 4.6 | +0.9 |
| 4-11 | 3.0 | 60 | 360 | 0.80 | 5.6 | +0.2 |
| 4-12 | 9.0 | 3 | 270 | 0.85 | 4.2 | +1.3 |
| 4-13 | 9.0 | 3 | 360 | 0.79 | 5.2 | +0.3 |
| 4-14 | 9.0 | 120 | 30 | 0.85 | 4.5 | +1.0 |
| 4-15 | 9.0 | 120 | 270 | 0.83 | 4.7 | +0.8 |
| 4-16 | 9.0 | 120 | 360 | 0.79 | 5.3 | +0.3 |
| 4-17 | 0.0 | 30 | 0 | 0.78 | 6.0 | 0.0 |
| 4-18 | 0.0 | 300 | 0 | 0.75 | 6.8 | −0.5 |
| 4-19 | 0.0 | 360 | 0 | 0.74 | 7.1 | −1.0 |

SQ: Squareness ratio (Br/Bm)

It is noted from the results shown in Table 4 that the effects aimed at were obtained by effecting the ultrasonic irradiation within five hours following the completion of the incorporation of the hardening agent.

EXAMPLE 5

A test was conducted to examine the method of application at the coating section.

The same magnetic coating material as used in Example 1 was irradiated with the ultrasonic wave for 3 seconds, with the operating depth H fixed at 3 mm, then left standing for 10 minutes, and coated so much by the method of extrusion nozzle coating, the method of reverse roll coating, and the method of gravure roll coating on the substrate as to produce, a magnetic layer 1.5 μm (drying) in thickness, and subjected to an orienting treatment, drying treatment, and calendering treatment. The samples consequently obtained were examined as to magnetic properties, surface roughness, and surface condition of the coat.

The results are shown in Table 5 below.

TABLE 5

| Sample No. | US treatment | Method of coating | Thickness of layer (μm) | SQ (Br/Bm) | Ra improvement (%) | Surface condition of layer |
|---|---|---|---|---|---|---|
| 5-1 | no-treat. | NOZZ | 1.5 | 0.76 | — | X |
| 5-2 | treat. | NOZZ | 1.5 | 0.85 | 10 | O |
| 5-3 | no-treat. | RV | 1.5 | 0.80 | — | O |
| 5-4 | treat. | RV | 1.5 | 0.85 | 3 | O |
| 5-5 | no-treat. | GC | 1.5 | 0.80 | — | O |
| 5-6 | treat. | GC | 1.5 | 0.85 | 4 | O |
| 5-7 | no-treat. | NOZZ | 0.3 | 0.76 | — | X |
| 5-8 | treat. | NOZZ | 0.3 | 0.86 | 16 | O |
| 5-9 | no-treat. | RV | 0.3 | 0.78 | — | X |
| 5-10 | treat. | RV | 0.3 | 0.85 | 8 | O |
| 5-11 | no-treat. | GC | 0.3 | 0.79 | — | X |
| 5-12 | treat. | GC | 0.3 | 0.85 | 8 | O |

TABLE 5-continued

| Sample No. | US treatment | Method of coating | Thickness of layer (μm) | SQ (Br/Bm) | Ra improvement (%) | Surface condition of layer |
|---|---|---|---|---|---|---|

‡"US treatment": Treatment by irradiation of ultrasonic wave
‡"Ra improvement": Ratio of change of Ra between presence and absence of treatment by irradiation of ultrasonic wave
‡"NOZZ": Method for extrusion nozzle application
‡"RV": Method of reverse roll application
‡"GC": Method of gravure roll application
‡"O": Excellent, "X": Poor It is remarked from the results shown in Table 5 that without reference to the method of coating, the ultrasonic treatment resulted in improving the magnetic properties, surface roughness, and the surface condition of the coat. It is noted that, among other methods, the method of extrusion nozzle coating which exerted no marked shear on the magnetic coating material between the time of dispersion and the time of coating brought about particularly favorable effects.

EXAMPLE 6

A test was carried out with respect to the coating of two magnetic layers on a substrate. A coating material composition for the formation of a lower layer and a coating material composition for the formation of an upper layer were prepared. The same magnetic coating material as used in Example 1 was adopted for the magnetic coating material composition for the formation of the upper layer and it was subjected to the ultrasonic treatment prior to use. This ultrasonic treatment was performed under the same conditions as used in Example 5, namely 3 seconds for the time of ultrasonic irradiation and 10 minutes for the subsequent waiting time, Tw.

The following composition was used for the coating material for the formation of the lower layer. This coating material was not given any ultrasonic treatment.
Composition 1 of magnetic coating material for formation of lower magnetic layer

| | |
|---|---|
| Ferromagnetic powder (Co-YFe$_2$O$_3$, Hc = 670 Oe, σ$_s$ = 75 emu/g, average length of major axis 0.25 μm, average ratio of axes 8) | 100 parts by weight |
| Vinyl chloride type copolymer (produced by Nippon Zeon K. K. and marketed under product code of "MR-110") | 9 parts by weight |
| Polyurethane resin A (produced by Toyo Boseki Co.,Ltd. and marketed under product code of "UR8200") | 4.5 parts by weight |
| Polyurethane resin B (produced by Toyo Boseki Co.,Ltd. and marketed under product code of "UR8700") | 4.5 parts by weight |
| α-Alumina (produced by Sumitomo Chemical Co., Ltd. and marketed under product code of "HIT60A") | 5 parts by weight |
| Stearic acid | 1 part by weight |
| Myristic acid | 1 part by weight |
| Butyl stearate | 1 part by weight |
| Methylethyl ketone | 88 parts by weight |
| Toluene | 88 parts by weight |
| Cyclohexane | 60 parts by weight |

This composition was given a thorough kneading treatment in a kneader and then dispersed, mixed, and diluted by means of a sand grinder mill. The magnetic coating material thus obtained, immediately before application to a substrate, was mixed with 3.6 parts by weight of a hardening agent (produced by Nippon Polyurethane K. K. and marketed under trademark designation of "Coronate L"). The resultant mixture and the upper-layer composition mentioned above were simultaneously applied in two layers in respectively prescribed thicknesses by the method of extrusion nozzle application.

A composition 2 for the formation of a different lower layer was prepared by using the composition 1 for the formation of the lower layer mentioned above while using an acicular α-iron oxide (having an average length of major diameter of 0.15 μm and an average ratio of axes of 6) in the place of the ferromagnetic powder of Co-γFe$_2$O$_3$. This composition 2 and the composition for the formation of the upper layer mentioned above were simultaneously applied in two layers of respectively prescribed thicknesses by the method of extrusion nozzle application.

The samples consequently obtained were rated with respect to the magnetic properties, electromagnetic transducer properties, and the surface condition of tape.

The results are shown in Table 6 below.

The C/N ratio indicated in Table 6 was determined by the following procedure.
C/N ratio A signal of a frequency of 7.6 MHz obtained by a synthesizer (produced by Hewlett-Packard Co. and marketed under product code of "3325A") was recorded on a magnetic tape by means of a video cassette recorder (produced by Sony Corporation and marketed under product code of "EV-S900") and then replayed by the same video cassette recorder and the ratio of the outputs of 7.6 MHz and 6.6 MHz of the replayed signal was measured with the aid of a spectrum analyzer (produced by Advantest K. K. and marketed under product code of "TR4171"). Then, the difference of the resultant output ratio (C/N) from that of the office standard tape of TDK was reported as reduced to the unit of dB.

TABLE 6

| Sample No. | US treatment of upper layer | Kind of lower layer | Lower layer thickness (μm) | SQ (Br/Bm) | Output at 7.6 MHz (dB) | C/N (dB) | Ra (nm) |
|---|---|---|---|---|---|---|---|
| 6-1 | no-treat. | Same | 1.8 | 0.76 | +2.3 | +1.1 | 5.2 |
| 6-2 | treat. | Same | 1.8 | 0.78 | +3.3 | +1.7 | 4.7 |
| 6-3 | no-treat. | Co-γ | 1.8 | 0.89 | +2.3 | +1.0 | 4.9 |
| 6-4 | treat. | Co-γ | 1.8 | 0.90 | +3.7 | +2.2 | 4.4 |
| 6-5 | no-treat. | Acic. α | 1.8 | 0.76 | +2.5 | +1.5 | 4.3 |
| 6-6 | treat. | Acic. α | 1.8 | 0.86 | +4.0 | +3.0 | 3.5 |

‡The upper layer had a thickness of 0.2 μm and the coating material corresponding to the upper layer was exclusively treated by irradiation of ultrasonic wave
‡"Same": The composition of the upper layer was used as unmodified for the lower layer
‡"Co-γ": The composition 1 containing Co-γe$_2$O$_3$ for the formation of the lower layer
‡"Acic. α": The composition 2 containing acicular α iron oxide for the formation of the lower layer It is noted from the results shown in Table 6 that without reference to the kind of composition used for the lower layer, the ultrasonic treatment performed exclusively on the upper layer, resulted in invariably improving the magnetic properties, output, C/N, and surface roughness. It is further noted that the degree to which these properties were improved by the performance of the ultrasonic treatment exclusively on the upper layer was markedly heightened in proportion as the contribution of the upper layer in the tape construction to the tape properties increased.

EXAMPLE 7

Two magnetic layers (applied layers) were formed on a substrate by following the procedure of Example 6 and the relation between the thickness of the upper layer and the effect of the ultrasonic treatment was studied. The composition of the upper layer was the same as in Example 1 and the composition of the lower layer was the same as the composition 2 (containing acicular α-iron oxide) for the formation of the lower layer in Example 6. These two compositions were simultaneously applied by the method of extrusion nozzle application. Samples having the thickness of the upper layer alone varied as shown in Table 7 below were prepared. These samples were tested for magnetic properties, electromagnetic transducer properties, and surface condition of tape. The operating depth, H, was fixed at 3 mm.

The results are shown in Table 7 below. In Example 7–9 and the subsequent examples indicated in Table 7, the concentrations of nonvolatile substances in coating materials were varied by varying the absolute amount of a solvent while keeping the ratio of a coating material to a solvent (methylethyl ketone/toluene/cyclohexanone) unchanged.

TABLE 7

| Sample No. | Concentration (wt %) | US treatment of upper layer | Upper layer thickness (μm) | (Br/Bm) | Output at 7.6 MHz (dB) | C/N (dB) | Ra (nm) |
|---|---|---|---|---|---|---|---|
| 7-1 | 30 | no-treat | 1.0 | 0.77 | +2.5 | +1.2 | 4.8 |
| 7-2 | 30 | treat. | 1.0 | 0.85 | +3.5 | +2.3 | 3.7 |
| 7-3 | 30 | no-treat | 0.3 | 0.77 | +2.8 | +1.5 | 4.4 |
| 7-4 | 30 | treat. | 0.3 | 0.85 | +3.7 | +2.7 | 3.5 |
| 7-5 | 30 | no-treat | 0.2 | 0.79 | +2.6 | +1.3 | 4.7 |
| 7-6 | 30 | treat. | 0.2 | 0.86 | +4.0 | +3.0 | 3.5 |
| 7-7 | 30 | no-treat | 0.15 | 0.79 | +2.6 | +1.1 | 4.8 |
| 7-8 | 30 | treat. | 0.15 | 0.87 | +4.3 | +3.0 | 3.7 |
| 7-9 | 20 | no-treat | 0.20 | 0.78 | +2.6 | +1.4 | 4.6 |
| 7-10 | 20 | treat. | 0.20 | 0.85 | +4.1 | +3.2 | 3.4 |
| 7-11 | 15 | no-treat | 0.15 | 0.78 | +2.4 | +1.0 | 4.7 |
| 7-12 | 15 | treat. | 0.15 | 0.86 | +4.3 | +3.2 | 3.6 |
| 7-13 | 30 | no-treat | 0.08 | 0.76 | +0.7 | +0.7 | 5.0 |
| 7-14 | 30 | treat. | 0.08 | 0.83 | +3.0 | +1.8 | 4.0 |
| 7-15 | 20 | no-treat | 0.08 | 0.77 | +0.8 | +0.7 | 5.1 |
| 7-16 | 20 | treat. | 0.08 | 0.84 | +3.2 | +1.9 | 3.9 |

‡"Concentration": Concentration of nonvolatile substances in coating material for upper layer The method of nozzle application used for varying the thickness of an applied layer is known in two types; the one type comprises varying the amount of the coating material being supplied and the other type comprises changing the concentration of nonvolatile substances in the coating material. It is noted from the results shown in Table 7 that without reference to the kind of method used for varying the thickness of an applied layer, the effect of the ultrasonic treatment increased in proportion as the thickness of the upper layer decreased.

EXAMPLE 8

In the same composition for a magnetic coating material as used in Example 1, the kind of ferromagnetic metal powder contained therein was varied to study the relation between the kind of magnetic powder and the effect of ultrasonic treatment. To be specific, the magnetic coating material in which the magnetic powder component alone was varied, was mixed with 3.3 parts by weight of a hardening agent, subjected to an ultrasonic treatment for 3.0 seconds after the elapse of 10 minutes following the step of mixture, and left standing for 15 minutes prior to application to a substrate. The operating depth, H, was fixed at 3 mm. The mixture obtained as described above and the non-magnetic coating material for the lower layer (containing an acicular α-iron oxide) were simultaneously applied in two superposed layers by the same method of extrusion nozzle application as used in Example 7. The upper layer had a thickness of 0.20 μm and the lower layer had a thickness of 1.80 μm. The samples thus prepared were tested for magnetic properties, electromagnetic transducer properties, and surface condition of tape.

The results are shown in Table 8 below.

TABLE 8

| Sample No. | 8-1 | 8-2 | 8-3 | 8-4 | 8-5 | 8-6 | 8-7 | 8-8 | 8-9 | 8-10 | 8-11 | 8-12 | 8-13 | 8-14 |
|---|---|---|---|---|---|---|---|---|---|---|---|---|---|---|
| Mag pow. | | | | | | | | | | | | | | |
| Hc (Oe) | 1500 | | 1700 | | 1700 | | 1700 | | 2000 | | 2000 | | 2000 | |
| σ$_s$ (emu/g) | 110 | | 120 | | 125 | | 130 | | 135 | | 140 | | 150 | |
| L (μm) | 0.20 | | 0.15 | | 0.15 | | 0.15 | | 0.08 | | 0.08 | | 0.10 | |
| R | 13 | | 9 | | 9 | | 8 | | 5 | | 5 | | 6 | |
| Co cont. (Wt %) | 0 | | 0 | | 5 | | 10 | | 15 | | 20 | | 30 | |
| Gc (%) | 150 | | 158 | | 164 | | 171 | | 177 | | 182 | | 193 | |
| US | | | | | | | | | | | | | | |
| t (sec) | — | 3.0 | — | 3.0 | — | 3.0 | — | 3.0 | — | 3.0 | — | 3.0 | — | 3.0 |
| Tw (min) | — | 15 | — | 15 | — | 15 | — | 15 | — | 15 | — | 15 | — | 15 |
| Ga MD | 150 | 152 | 157 | 160 | 163 | 168 | 168 | 174 | 171 | 177 | 173 | 180 | 181 | 190 |
| Ga TD | 165 | 168 | 169 | 175 | 174 | 183 | 178 | 188 | 180 | 195 | 182 | 194 | 190 | 205 |
| Rating of surface condition | ◯ | ◯ | ◯ | ◯ | Δ | ◯ | X | ◯ | X | ◯ | XX | ◯ | XX | ◯ |
| Ra (nm) | 4.5 | 4.2 | 4.5 | 4.0 | 5.0 | 4.5 | 5.4 | 4.4 | 5.5 | 3.9 | 6.0 | 4.0 | 7.0 | 4.5 |

TABLE 8-continued

| Sample No. | 8-1 | 8-2 | 8-3 | 8-4 | 8-5 | 8-6 | 8-7 | 8-8 | 8-9 | 8-10 | 8-11 | 8-12 | 8-13 | 8-14 |
|---|---|---|---|---|---|---|---|---|---|---|---|---|---|---|
| SQ (Br/Bm) | 0.86 | 0.89 | 0.83 | 0.88 | 0.82 | 0.87 | 0.80 | 0.88 | 0.78 | 0.86 | 0.76 | 0.86 | 0.76 | 0.85 |
| Output 7 MHz (dB) | 0 | +0.5 | +0.4 | +1.0 | +1.0 | +2.0 | +1.8 | +2.8 | +2.5 | +3.6 | +2.5 | +4.0 | +2.2 | +4.8 |

L: Length of major axis, R: Ratio of axes, t: Time for US treatment, Tw: Waiting time
Gc: Gloss of casting film of coating material, Ga: Gloss of apllied layer, MD: Direction of mechanical conveyance, TD: Direction of width,
‡The degree of gloss was determined at an angle of incidence of 60° by means of Murakami Gross Meter GM-3D
‡The surface condition of applied layer was rated by visual observation as to streaks, uneven thickness, and other coating defects on the following scale.
○ . . . Perfect surface condition
Δ . . . Presence of patchy gloss on surface and streaky undulation observed under an optical microscope at 100 magnification
X . . . An undulation of streaks at a minute pitch observed on the surface of applied layer with unaided eyes
XX . . . An aggregate of coarse irregularities and streaks observed with unaided eyes It is noted from the results shown in Table 8 that the effect of the ultrasonic treatment was particularly prominent when the ferromagnetic powder used in the coating material had an amount of saturated magnetization of 125 emu/g and over, and an average length of major axis of 0.15 μm and less.

EXAMPLE 9

Two magnetic layers (applied layers) each using a coating material which had under gone an ultrasonic treatment were formed on a substrate to study the effect of using such two magnetic layers.

To be specific, the composition of magnetic coating material for the formation of the upper layer was the same as in Example 1 and was given an ultrasonic treatment prior to use. This ultrasonic treatment was performed for 3 seconds immediately after the incorporation of the hardening agent and then followed by 10 minutes' waiting time before the application to the substrate. The operating depth, H, was fixed at 3 mm.

The composition of magnetic coating material for the formation of the lower layer was in three types, (1) the same composition as used for the formation of the upper layer, (2) the same composition 1 (Co-γFe$_2$O$_3$) of magnetic coating material as used in Example 6 for the formation of the lower layer, and (3) the same composition 2 (acicular α iron oxide) of coating material as used in Example 6 for the formation of the lower layer. The ultrasonic treatment was performed for one second immediately after the incorporation of the hardening agent and followed by 5 minutes' waiting.

The two coating materials were simultaneously applied in two superposed layers by the method of extrusion nozzle application. The upper layer had a thickness of 0.20 μm and the lower layer had a thickness of 1.80 μm. The samples thus prepared were tested for magnetic properties, electromagnetic transducer properties, and surface condition of tape.

The results are shown in Table 9 below.

TABLE 9

| Sample No. | US treatment of lower layer | Kind of lower layer | SQ (Br/Bm) | Output at 7.6 MHz (dB) | C/N (dB) | Ra (nm) |
|---|---|---|---|---|---|---|
| 9-1 | no-treat. | Same | 0.78 | +3.3 | +1.7 | 4.7 |
| 9-2 | treat. | Same | 0.86 | +3.7 | +2.4 | 4.4 |
| 9-3 | no-treat. | Co-γ | 0.90 | +3.7 | +2.2 | 4.4 |
| 9-4 | treat. | Co-γ | 0.91 | +4.0 | +2.7 | 4.0 |
| 9-5 | no-treat. | Acic. α | 0.86 | +4.0 | +3.0 | 3.5 |
| 9-6 | treat. | Acic. α | 0.86 | +4.1 | +3.5 | 3.2 |

TABLE 9-continued

| Sample No. | US treatment of lower layer | Kind of lower layer | SQ (Br/Bm) | Output at 7.6 MHz (dB) | C/N (dB) | Ra (nm) |
|---|---|---|---|---|---|---|

‡The upper layer had a thickness of 0.2 μm and the lower layer had a thickness of 1.8 μm
‡"Same": The composition of the upper layer was used as unmodified for the lower layer
‡"Co-γ": The composition 1 containing Co-γe$_2$O$_3$ for the formation of the lower layer
‡"Acic. α": The composition 2 containing acicular α iron oxide for the formation of the lower layer It is noted from the results shown in Table 9 that the ultrasonic treatment performed on not only the coating material for the formation of the upper layer but also that for the formation of the lower layer was effective.

EXAMPLE 10

An undercoating layer (referred to hereinafter as "lower layer") containing carbon black and a magnetic layer (referred to hereinafter as "upper layer") were sequentially formed on a substrate, with due consideration to the concentration of solids in the lower layer, to study the effect of using a coating material given an ultrasonic treatment for each of the upper and the lower layer.

To be specific, the composition of magnetic coating material for the formation of the upper layer was the same as used in Example 1 and was given the ultrasonic treatment prior to use. This ultrasonic treatment was performed for 3 seconds and then followed by 10 minutes' waiting time, Tw, in the same manner as in Example 5. The operating depth, H, was fixed at 3 min.

The coating material for the formation of the lower layer had the following composition.
Composition of coating material for formation of lower layer

| | |
|---|---|
| Aciculara α-iron oxide (average length of major axis 0.15 μm and BET value 53 m$^2$/g) | 100 parts by weight |
| Carbon black (produced by Columbian Carbon K. K. and marketed under trademark designation of "Conductex SC") | 25 parts by weight |
| Vinyl chloride type copolymer (produced by Nippon Zeon K. K. and marketed under product code of "MR-110") | 10 parts by weight |
| Polyurethane resin A (produced by Toyo Boseki Co.,Ltd. and marketed under product code of "UR8200") | 5 parts by weight |
| Polyurethane resin B (produced by Toyo Boseki Co.,Ltd. and marketed under product code of "UR8700") | 5 parts by weight |

-continued

| | |
|---|---|
| α-Alumina (produced by Sumitomo Chemical Co., Ltd. and marketed under product code of "HIT60A") | 10 parts by weight |
| Stearic acid | 2 parts by weight |
| Butyl stearate | 1 part by weight |
| Methylethyl ketone | Y1 part by weight |
| Toluene | Y2 parts by weight |
| Cyclohexanone | Y3 parts by weight |

Part or the whole of the materials enumerated above was kneaded in a kneader and then dispersed, mixed, and diluted by means of a sand grinder mill. Here, the amounts Y1, Y2, and Y3 of the relevant solvents were varied so as to give concentrations of nonvolatile substances indicated in Table 10 below.

Each coating material, immediately prior to application to a substrate, was mixed with 3.6 parts by weight of a hardening agent (produced by Nippon Polyurethane K. K. and marketed under trademark designation of "Coronate L"), subjected to an ultrasonic treatment for 1 sec., and stirred for 15 minutes. The resultant mixture was applied simultaneously with the coating material for the upper layer.

The samples consequently obtained as indicated in Table 10 were tested for coating property, magnetic properties, electro-magnetic transducer properties, and surface condition of tape.

The results are shown in Table 10 below.

TABLE 10

| Lower layer | | | | | | | | |
|---|---|---|---|---|---|---|---|---|
| Solid Conc. (wt %) | 20 | 20 | 25 | 25 | 30 | 30 | 35 | 35 |
| US treatment | no-treat. | treat. | no-treat. | treat. | no-treat. | treat. | no-treat. | treat. |
| Coating characteristic | ORS[‡1] | ORS[‡1] | Excellent | Excellent | ORS[‡2] | Excellent | INA[‡2] | Excellent |
| Output (dB) | +1.7 | +1.5 | +2.8 | +3.0 | +2.0 | +3.9 | — | +4.0 |
| C/N (dB) | +1.5 | +1.3 | +2.2 | +2.4 | +1.8 | +3.0 | — | +3.1 |
| Ra (nm) | 5.1 | 5.3 | 4.7 | 4.5 | 4.8 | 3.7 | — | 3.4 |

"ORS": Occurrence of rough surface
"INA": Incapable of application
[‡1]Verging on mixture between upper and lower layers
[‡2]Exfoliation of upper layer
Thickness: Upper layer 0.2 μm, Lower layer 1.8 μm Heretofore, when such a material as carbon black which has a strong property of thixotropy is used in a lower layer, it has been necessary to lower the concentration of solids in the coating material. When this coating material having a lowered concentration of solids and a magnetic coating material are simultaneously applied in the form of superposed layers, the produced layers inevitably incur various problems such as heavy surface coarsening and deviation of points of orientation. It is noted from the results shown in Table 10, that even in case of using the coating material of high thixotropy in the lower layer, the coating material in the lower layer being treated with the ultrasonic wawe could be harmony with the coating material in the upper layer being coated on the lower layer. Therefore, it could be confirmed to obtain a tape of high performance.

The effect of this invention is evident from the results which have been described above. Specifically, in the method of this invention for the production of a magnetic recording medium, since the optimum manner of using a device for ultrasonic treatment, the optimum conditions for ultrasonic irradiation, and the optimum interval between the time the magnetic coating material is irradiated with the ultrasonic wave and the time the pretreated magnetic coating material is applied to the substrate are defined, the magnetic coating material to be obtained allows ideal dispersion of a magnetic powder therein and only sparingly suffers agglomeration of the dispersed magnetic powder. The magnetic recording medium which results from the coating of this magnetic coating material on a substrate has the advantage of excelling in squareness ratio, surface roughness, output, and electromagnetic transducer properties.

What is claimed is:

1. A method for producing a magnetic recording medium by passing a magnetic coating material comprising a ferromagnetic powder and a binder resin through an ultrasonic treating device under the operating conditions of 10 to 200 kHz of frequency of oscillation and 10 to 100 μm of amplitude of ultrasonic wave thereby effecting ultrasonic treatment of said magnetic coating material and coating the treated magnetic coating material on a substrate either directly or through an undercoating layer, wherein said ultrasonic treating device comprises an ultrasonic treating tank adapted to effect ultrasonic wave treatment of said magnetic coating material by passing said material therethrough, an ultrasonic wave horn inserted into said ultrasonic treating tank and provided with an operating end surface capable of exerting an ultrasonic oscillation on said magnetic coating material, and an ultrasonic wave oscillator connected to a basal part side of said ultrasonic wave horn, an operating depth H defined by the distance from said operating end surface of said ultrasonic wave horn to a bottom wall surface of said ultrasonic treating tank opposed to said operating end surface is set at a magnitude in the range of 2 to 40 mm, and said magnetic coating material to be coated on said substrate is subjected to said ultrasonic treatment by the use of said device with the duration of the irradiation of the ultrasonic wave kept in a range represented by the following formula (1):

$$H/6.6 \leq t \leq 3H \qquad \text{Formula (1)}$$

wherein t stands for the duration (seconds) of irradiation of the ultrasonic wave and H stands for the operating depth (mm).

2. A method according to claim 1, wherein said duration of irradiation of the ultrasonic wave is set in a range represented by the following formula (1-2):

$$H/6.6 \leq t \leq 2H \qquad \text{Formula (1-2)}$$

3. A method according to claim 1, wherein said operating depth H is set in a range of 2 to 30 mm.

4. A method according to claim 1, wherein an inner volume of an available dispersion chamber defined by an area of the operating end surface of the ultrasonic wave horn and the operation depth is set in the range of 0.6 to 80 cm$^3$.

5. A method according to claim 1, wherein the magnetic coating material treated by said ultrasonic wave is coated on a substrate directly or through an undercoating layer within a waiting time, Tw (minutes), satisfying the following formula (2):

$$0<Tw\leq 26.5\ t/H+44 \quad \text{Formula (2).}$$

6. A method according to claim 1, wherein said hardening agent is incorporated in said magnetic coating material prior to the treatment with an ultrasonic wave oscillation and the treatment with said ultrasonic wave oscillation is carried out within five hours following said incorporation of said hardening agent.

7. A method according to claim 1, wherein the method for coating said magnetic coating material subsequent to said treatment with the ultrasonic wave oscillation on said substrate is an extrusion nozzle coating method, a reverse roll coating method, or a gravure roll coating method.

8. A method according to claim 1, wherein said ferromagnetic powder to be contained in said magnetic coating material is a magnetic powder of ferromagnetic metal containing 5 to 30% by weight of Co based on the amount of Fe and having a saturated amount of magnetization, $\sigma_s$, of 125 emu/g and over, and an average length of major axis of 0.15 µm and less.

9. A method according to claim 1, wherein said undercoating layer is a magnetic layer comprising a ferromagnetic powder and a binder resin.

10. A method according to claim 1, wherein said undercoating layer is a nonmagnetic layer comprising a nonferromagnetic powder and a binder resin.

11. A method according to claim 1, wherein said undercoating layer is formed of a magnetic coating material for the formation of a lower magnetic layer comprising a ferromagnetic powder and a binder resin and said magnetic coating material has undergone an ultrasonic treatment under ultrasonic treating conditions falling within the ranges set forth in claim 1.

12. A method according to claim 1, wherein said undercoating layer is formed of a coating material for the formation of an undercoating layer comprising a nonferromagnetic powder and a binder resin, and said coating material has undergone an ultrasonic treatment under ultrasonic treating conditions falling within the ranges set forth in claim 1.

13. A method according to claim 12, wherein said nonferromagnetic powder is carbon black or α-iron oxide.

* * * * *